US007536506B2

(12) United States Patent
Ashmore et al.

(10) Patent No.: US 7,536,506 B2
(45) Date of Patent: *May 19, 2009

(54) RAID CONTROLLER USING CAPACITOR ENERGY SOURCE TO FLUSH VOLATILE CACHE DATA TO NON-VOLATILE MEMORY DURING MAIN POWER OUTAGE

(75) Inventors: Paul Andrew Ashmore, Longmont, CO (US); Dwight Oliver Lintz, Lyons, CO (US); Gene Maine, Erie, CO (US); Victor Key Pecone, Lyons, CO (US); Rex Weldon Vedder, Boulder, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 450 days.

This patent is subject to a terminal disclaimer.

(21) Appl. No.: 11/226,825

(22) Filed: Sep. 14, 2005

(65) Prior Publication Data

US 2006/0015683 A1   Jan. 19, 2006

Related U.S. Application Data

(63) Continuation-in-part of application No. 11/054,203, filed on Feb. 9, 2005, now Pat. No. 7,380,055.

(60) Provisional application No. 60/581,556, filed on Jun. 21, 2004, provisional application No. 60/691,853, filed on Jun. 17, 2005, provisional application No. 60/705,997, filed on Aug. 4, 2005.

(51) Int. Cl.
*G06F 13/00* (2006.01)
*G06F 13/28* (2006.01)

(52) U.S. Cl. ..................................... 711/114

(58) Field of Classification Search .................. 711/114
See application file for complete search history.

(56) References Cited

U.S. PATENT DOCUMENTS 4,874,960 A   10/1989   Cybela (Continued)

FOREIGN PATENT DOCUMENTS

| EP | 1338874 | 8/2003 |
|----|---------|--------|
| EP | 1603026 | 12/2005 |
| GB | 2362768 | 11/2001 |
| JP | 2004037258 | 2/2004 |

OTHER PUBLICATIONS

Aerogel, http://en.wikipedia.org/wiki/Aerogel.*

(Continued)

*Primary Examiner*—Matt Kim
*Assistant Examiner*—Edward J Dudek
(74) *Attorney, Agent, or Firm*—E. Alan Davis; James W. Huffman

(57) ABSTRACT

A write-caching RAID controller is disclosed. The controller includes a CPU that manages transfers of posted-write data from host computers to a volatile memory and transfers of the posted-write data from the volatile memory to storage devices when a main power source is supplying power to the RAID controller. A memory controller flushes the posted-write data from the volatile memory to the non-volatile memory when main power fails, during which time capacitors provide power to the memory controller, volatile memory, and non-volatile memory, but not to the CPU, in order to reduce the energy storage requirements of the capacitors. During main power provision, the CPU programs the memory controller with information needed to perform the flush operation, such as the location and size of the posted-write data in the volatile memory and various flush operation characteristics.

146 Claims, 8 Drawing Sheets

U.S. PATENT DOCUMENTS

| | | | |
|---|---|---|---|
| 5,414,861 A * | 5/1995 | Horning | 365/229 |
| 5,448,719 A * | 9/1995 | Schultz et al. | 714/5 |
| 5,596,708 A * | 1/1997 | Weber | 714/6 |
| 5,625,237 A | 4/1997 | Saeki et al. | |
| 5,758,054 A * | 5/1998 | Katz et al. | 714/22 |
| 6,304,981 B1 | 10/2001 | Spears et al. | |
| 6,829,724 B2 | 12/2004 | Farabaugh et al. | |
| 6,838,923 B2 | 1/2005 | Pearson | |
| 6,847,192 B2 | 1/2005 | Turner et al. | |
| 6,880,967 B2 | 4/2005 | Isozumi et al. | |
| 7,051,223 B2 | 5/2006 | Batchelor et al. | |
| 2002/0161970 A1* | 10/2002 | Busser | 711/114 |
| 2003/0046503 A1 | 3/2003 | Park | |
| 2004/0054851 A1 | 3/2004 | Acton et al. | |
| 2005/0132178 A1* | 6/2005 | Balasubramanian | 713/1 |
| 2005/0235098 A1* | 10/2005 | Tamura et al. | 711/104 |
| 2006/0069870 A1 | 3/2006 | Nicholson et al. | |
| 2006/0080515 A1 | 4/2006 | Spiers et al. | |
| 2006/0106990 A1* | 5/2006 | Benhase et al. | 711/135 |
| 2007/0106918 A1 | 5/2007 | Oyanagi | |

OTHER PUBLICATIONS

ATA-ATAPI, http://ata-atapi.com/.*
Hearst Electronic Products, http://www.electronicproducts.com/print.asp?ArticleURL=toshiba.apr2004.html, Apr. 2004.*
New Computers Based on Non-Volatile Random Access Memory, http://www.techneon.com/paper/nvram.html, Jul. 2003.*
Secure Digital SD PCMCIA Adapter, http://www.mittoni.com.au/secure-digital-sd-pcmcia-adapter-p-1182.html, Jun. 2002.*

* cited by examiner

*Fig. 3*

<u>Control and Status Registers</u>

202

| NVB_FLUSH_CTRL 302 |
| --- |
| NVB_RESTORE_CTRL 304 |
| NVB_RAM_START_ADDR1 306 |
| NVB_ATA_START_ADDR1 308 |
| NVB_SIZE1 312 |
| NVB_RAM_START_ADDR2 314 |
| NVB_ATA_START_ADDR2 316 |
| NVB_SIZE2 318 |
| NVB_SECTOR_COUNT 322 |
| NVB_PROGRESS 324 |
| ATA_INT_STATUS 326 |
| ATA_INT_ENABLE 328 |
| NVB_ERROR_CODE 332 |
| NVB_CONFIG 334 |
| ATA_RESET 336 |
| ATA_CRC 338 |
| ATA Direct Access Registers 342 |

RAID Controller Operation

RAID Controller Operation (Alternate Embodiment)

RAID CONTROLLER USING CAPACITOR ENERGY SOURCE TO FLUSH VOLATILE CACHE DATA TO NON-VOLATILE MEMORY DURING MAIN POWER OUTAGE

CROSS REFERENCE TO RELATED APPLICATION(S)

This application is a continuation-in-part of pending U.S. Non-Provisional application Ser. No. 11/054,203 filed Feb. 9, 2005, now U.S Pat. No. 7,380,055 entitled APPARATUS AND METHOD IN A CACHED RAID CONTROLLER UTILIZING A SOLID STATE BACKUP DEVICE FOR IMPROVING DATA AVAILABILITY TIME, which is hereby incorporated by reference for all purposes, and which claims the benefit of expired U.S. Provisional Application Ser. No. 60/581,556 filed Jun. 21, 2004, entitled PREEMPTIVE RECONSTRUCT FOR REDUNDANT RAID ARRAYS, which is hereby incorporated by reference for all purposes.

This application claims the benefit of the following pending U.S. Provisional Applications, which are hereby incorporated by reference for all purposes.

| Ser. No. (Docket No.) | Filing Date | Title |
| --- | --- | --- |
| 60/691,853 (CHAP.0127) | Jun. 17, 2005 | DATA BACKUP METHOD TO NON-VOLATILE MEMORY USING CAPACITOR ENERGY STORAGE |
| 60/705,997 (CHAP.0131) | Aug. 4, 2005 | SUPER CAPACITOR-POWERED RAID CONTROLLER |

FIELD OF THE INVENTION

The present invention relates in general to the field of write-caching RAID controllers, and particularly to the preserving of write-cached data during the loss of main power.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

An important characteristic of RAID controllers, particularly in certain applications such as transaction processing or real-time data capture of large data streams, is to provide fast write performance. In particular, the overall performance of the computer system may be greatly improved if the write latency of the RAID controller is relatively small. The write latency is the time the RAID controller takes to complete a write request from the computer system.

Many RAID controllers include a relatively large cache memory for caching user data from the disk drives. Caching the data enables the RAID controller to quickly return data to the computer system if the requested data is in the cache memory since the RAID controller does not have to perform the lengthy operation of reading the data from the disk drives. The cache memory may also be employed to reduce write request latency by enabling what is commonly referred to as posted-write operations. In a posted-write operation, the RAID controller reads the data specified by the computer system from the computer system into the RAID controller's cache memory and then immediately notifies the computer system that the write request is complete, even though the RAID controller has not yet written the data to the disk drives. Posted-writes are particularly useful in RAID controllers, since in some redundant RAID levels a read-modify-write operation to the disk drives must be performed in order to accomplish the system write request. That is, not only must the specified system data be written to the disk drives, but some of the disk drives may also have to be read before the user data and redundant data can be written to the disks, which, without the benefit of posted-writes, may make the write latency of a RAID controller even longer than a non-RAID controller.

However, posted-write operations make the system vulnerable to data loss in the event of a power failure. This is because the cache memory is a volatile memory that loses the user data when power is lost and the data has not yet been written to the disk drives.

To solve this problem, some RAID controllers include a battery to continue to provide power to the cache memory in the event of a loss of main power. Although the battery greatly reduces the likelihood that user data will be lost, because the energy stored in the battery is finite, the possibility still exists that the battery energy will run out before main power can be restored, in which case the user data will be lost. The minimum length of time the battery must supply power to the cache memory varies among users of RAID systems; however, many consumers require at least 72 hours in the event a power failure occurs on a weekend.

However, there are some well-known limitations associated with the use of batteries in this application. First, batteries are a relatively expensive component of the RAID controller. Second, for many of the relevant battery technologies the ability of the battery to hold a charge begins to degrade within two or three years, which is typically less than the expected lifetime of the RAID controller. Consequently, the RAID controller must be designed with the battery as a field-replaceable unit, and in many cases, as a hot-pluggable field-replaceable unit. This adds further cost to the RAID controller. Third, the operating temperature range of batteries outside of which their lifetime and performance degrade is relatively small. Fourth, after the battery has been drained due to a main power outage, the RAID controller must operate in lower performance write-through cache mode until the battery is re-charged, and the re-charge time of batteries is relatively long. Fifth, as the size of cache memories increases, so does the amount of energy the battery must provide during the main power outage. Given contemporary battery energy densities, the size of the battery required to provide the required amount of energy may exceed the available space within the RAID controller.

Therefore, what is needed is a RAID controller that employs an alternative solution for maintaining volatile posted-write data during a main power outage.

BRIEF SUMMARY OF INVENTION

The present invention provides a RAID controller that uses capacitors rather than batteries to supply power in the event of a loss of main power. The RAID controller also includes a non-volatile memory, such as a FLASH memory, to which posted-write data can be flushed from cache memory when main power is lost. The RAID controller also includes a memory controller that is capable of performing the flush operation of the posted-write data. This reduces the amount of energy storage capacity requirement of the capacitors for at least two reasons: first, the capacitors do not have to supply power to the CPU of the RAID controller, since the CPU does not perform the flush operation; second, the memory controller performs the flush operation faster than the CPU would.

In one aspect, the present invention provides a write-caching redundant array of inexpensive disks (RAID) controller, including a volatile memory, a non-volatile memory, and a central processing unit (CPU). The CPU manages transfers of posted-write data from host computers to the volatile memory and transfers of the posted-write data from the volatile memory to storage devices when a main power source is supplying power to the RAID controller. The RAID controller also includes a memory controller, coupled to the volatile memory and the non-volatile memory. The memory controller, rather than the CPU, flushes the posted-write data from the volatile memory to the non-volatile memory when the main power source fails to supply power to the RAID controller. The RAID controller also includes at least one capacitor, coupled to provide power to the memory controller, the volatile memory, and the non-volatile memory when the main power supply fails to supply power to the RAID controller. The CPU is excluded from receiving power from the at least one capacitor when the main power supply fails to supply power to the RAID controller.

In another aspect, the present invention provides a method for preserving posted-write data in a write-caching redundant array of inexpensive disks (RAID) controller. The method includes supplying power, by at least one capacitor, to a volatile memory, a non-volatile memory, and a memory controller of the RAID controller, in response to a loss of main power to the RAID controller. The method also includes foregoing supplying power, by the at least one capacitor, to a central processing unit (CPU) of the RAID controller, in response to the loss of main power to the RAID controller. The CPU manages transfers of the posted-write data from host computers to the volatile memory and transfers of the posted-write data from the volatile memory to storage devices when main power is being supplied to the RAID controller prior to the loss thereof. The method also includes flushing posted-write data, by the memory controller rather than by the CPU, from the volatile memory to the non-volatile memory, in response to the loss of main power.

In another aspect, the present invention provides a write-caching redundant array of inexpensive disks (RAID) controller, including a volatile memory, a non-volatile memory, and a backup circuit, coupled to the volatile memory and the non-volatile memory, which flushes posted-write data from the volatile memory to the non-volatile memory when a main power source fails to supply power to the RAID controller. The RAID controller also includes at least one capacitor, coupled to provide power to the backup circuit, the volatile memory, and the non-volatile memory when the main power supply fails to supply power. In one aspect, the backup circuit comprises a CPU that manages transfers of the posted-write data from host computers to the volatile memory and transfers of the posted-write data from the volatile memory to storage devices when the main power source is supplying power to the RAID controller.

In another aspect, the present invention provides a write-caching redundant array of inexpensive disks (RAID) controller, including a volatile memory, a non-volatile memory, and a central processing unit (CPU). The CPU manages transfers of posted-write data from host computers to the volatile memory and transfers of the posted-write data from the volatile memory to storage devices when a main power source is supplying power to the RAID controller. The RAID controller also includes a memory controller, coupled to the volatile memory and the non-volatile memory. The memory controller, rather than the CPU, flushes the posted-write data from the volatile memory to the non-volatile memory when the main power source fails to supply power to the RAID controller. The RAID controller also includes at least one battery, coupled to provide power to the memory controller, the volatile memory, and the non-volatile memory when the main power supply fails to supply power to the RAID controller. The CPU is excluded from receiving power from the at least one battery when the main power supply fails to supply power to the RAID controller.

An advantage of the embodiments employing the capacitors as a re-chargeable energy source is that capacitors are typically less expensive than comparable energy density batteries. Another advantage is that when main power is restored, the capacitors may be recharged much more quickly than batteries (typically on the order of minutes, in contrast to hours for batteries of comparable energy storage capacity); consequently, when main power is restored the capacitor-based RAID controller need not operate in write-through mode as long as a RAID controller that employs a battery. Another advantage is that the lifetime of capacitors is typically longer than batteries such that, unlike batteries, the capacitors may not need to be a field-replaceable unit. For example, some capacitors have approximately twice the lifetime of batteries. Furthermore, some capacitors tolerate a wider range of environmental conditions than batteries. For example, current Lithium-ion battery technologies are limited to an operating temperature range of approximately 45-60 degrees Celsius, whereas some capacitors can operate at up to 85 degrees Celsius.

An advantage of the embodiments employing the non-powered-CPU flush operation of cached data from the cache memory to non-volatile memory by the memory controller is that they require less energy consumption than a CPU-assisted flush operation. Consequently, the capacitors, battery, or other re-chargeable energy source employed on the RAID controller may be smaller, both in terms of volume and energy capacity, than required by a RAID controller that employs a relatively large power consuming CPU to perform the flush. Additionally, the memory controller is capable of performing the flush operation in a shorter amount of time than the CPU, which also reduces the energy capacity requirement of the re-chargeable energy source. Finally, the memory controller performing the flush operation greatly reduces the complexity of the software executing on the CPU since the software no longer must handle the non-graceful transition from normal processing during main power operation to a flush mode of operation in the event of a loss of main power.

BRIEF DESCRIPTION OF THE DRAWINGS

FIG. 3 is a block diagram illustrating the CSRs of FIG. 2 according to the present invention.

DETAILED DESCRIPTION

Figure 1:
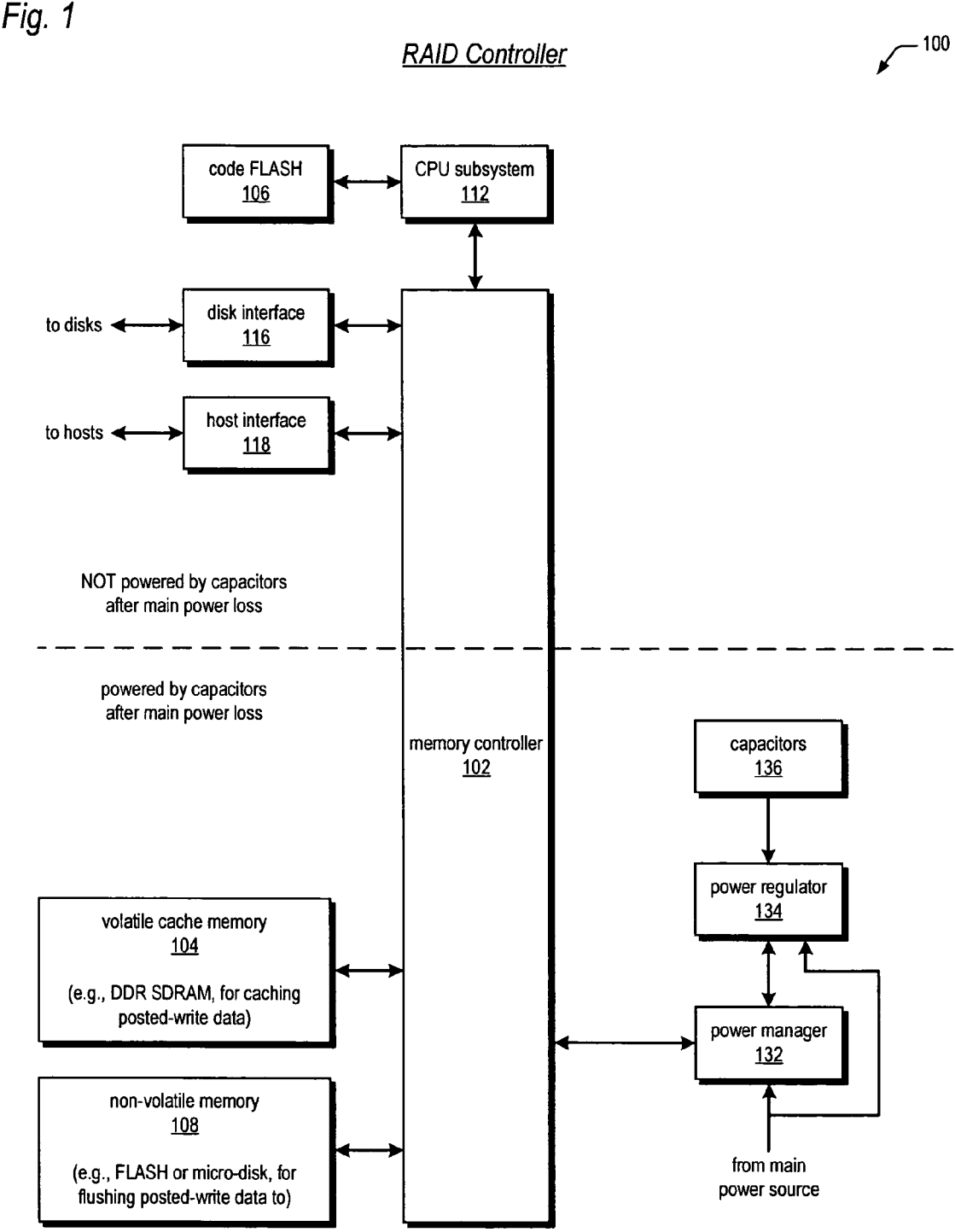
FIG. 1 is a block diagram illustrating a RAID controller according to the present invention.

Referring now to FIG. 1, a block diagram illustrating a RAID controller 100 according to the present invention is shown. In one embodiment, the RAID controller 100 may be one of a pair of active-active redundant fault-tolerant RAID controllers for providing high data availability. In the event of a failure of one RAID controller 100, such as the failure to flush posted-write data from volatile memory to non-volatile memory as described herein, the system may failover to the other RAID controller 100. Advantageously, the RAID controller 100 includes one or more capacitors for supplying power to selected portions of the RAID controller 100 circuits during the loss of main power for enabling a memory controller thereof to quickly and efficiently flush the posted-write data from a cache memory to a non-volatile memory without assistance from a CPU subsystem of the RAID controller 100, which is not powered by the capacitors, as described in detail herein.

The RAID controller 100 includes a host interface 118 for interfacing with host computers. In one embodiment, the RAID controller 100 is a local bus-based controller, such as a controller that plugs into, or is integrated into, a local I/O bus of the host computer system, such as a PCI, PCI-X, Compact-PCI, PCI-Express, PCI-X2, EISA, VESA, VME, RapidIO, AGP, ISA, 3GIO, HyperTransport, Futurebus, MultiBus, or any other local bus. In this type of embodiment, the host interface 118 comprises a local bus interface of the local bus type. In another embodiment, the RAID controller 100 is a standalone controller in a separate enclosure from the host computers that issue I/O requests to the RAID controller 100. For example, the RAID controller 100 may be part of a storage area network (SAN). In this type of embodiment, the host interface 118 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like.

The RAID controller 100 also includes a disk interface 116 for interfacing to disk drives or other mass storage devices, including but not limited to, tape drives, solid-state disks (SSD), and optical storage devices, such as CDROM or DVD drives. The disk drives store user data. The disk interface 116 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 100 reads and writes data from or to the disk drives in response to I/O requests received from host computers.

The RAID controller 100 also includes a volatile cache memory 104, or cache memory 104, or volatile memory 104. The volatile cache memory 104 is volatile because it ceases to store its data when it is not powered. In one embodiment, the volatile cache memory 104 comprises double-data-rate synchronous dynamic random access memory (DDR SDRAM), which includes a self-refresh mode. When the SDRAM is placed into self-refresh mode, the SDRAM consumes less power than when not operating in self-refresh mode. In other embodiments, the volatile cache memory 104 may include other types of volatile memory, including but not limited to static random access memory (SRAM). The amount of volatile cache memory 104 may be significant. Embodiments in which the volatile cache memory 104 comprises 512 MB, 1 GB, and 2 GB are contemplated; however, other embodiments are contemplated in which more or less volatile cache memory 104 is included on the RAID controller 100.

The volatile cache memory 104 is employed by the RAID controller 100 to buffer data transferred between the hosts and disks. When a host requests data to be written to the disks, the RAID controller 100 transfers the data from the host via the host interface 118 into the volatile cache memory 104 and subsequently transfers the data from the volatile cache memory 104 via the disk interface 116 to the disks. Conversely, when a host requests data to be read from the disks, the RAID controller 100 transfers the data from the disks via the disk interface 116 to the volatile cache memory 104 and subsequently transfers the data from the volatile cache memory 104 via the host interface 118 to the host.

As mentioned above, when a host requests data be written to the disks, the RAID controller 100 transfers the data from the host via the host interface 118 into the volatile cache memory 104 and subsequently transfers the data from the volatile cache memory 104 via the disk interface 116 to the disks. Normally, the RAID controller 100 does not indicate to the host that the write request is complete until the data is actually written to disk. However, if configured to do so, the RAID controller 100 may cache the data in the volatile cache memory 104 and indicate to the host that the write request is complete before the data is actually written to the disk, and then subsequently write, or flush, the data to disk. This operation is referred to as write-caching, or may also be referred to as a posted-write operation. The data associated with a posted-write operation is referred to as posted-write data, or write-cache data. That is, posted-write data is data stored in the volatile cache memory 104 that has not yet been written to disk but concerning which the RAID controller 100 has told the host that the write operation has completed. Additionally, the posted-write data as referred to herein may comprise metadata, which is used to refer to control information required to write the data to disk, including but not limited to, the logical block addresses and disk drive unit numbers to which the data must be written, and information specifying whether the data is part of a RAID array with a RAID level requiring redundant data to be generated based on the posted-write data that also must be written to disk.

The volatile cache memory 104 may also be used by the RAID controller 100 to perform read-caching of data, i.e., to provide requested data to the hosts from the volatile cache memory 104, rather than from the disks, if the requested data is already present in the volatile cache memory 104 because of a previous read request of the same data. Finally, the RAID controller 100 may use the volatile cache memory 104 for buffering redundant RAID data generated for writing to the disks.

The RAID controller 100 also includes a CPU subsystem 112 for fetching and executing program instructions to control the transfer of data between the disk drives and the hosts, such as described above. The CPU subsystem 112 may include any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the CPU subsystem 112 comprises a Transmeta TM8800 processor that includes an integrated North Bridge and an ALi M1563S South Bridge. In another embodiment, the CPU subsystem 112 comprises an Intel Celeron M processor and an MCH and ICH. In one embodiment, the CPU subsystem 112 also includes RAM for storing program instructions that are fetched and executed by the microprocessor and a FLASH memory 106, coupled to the CPU subsystem 112, for storing the program instructions in a non-volatile manner and which is decompressed and written to the program RAM for execution by the microprocessor. In one embodiment, the FLASH memory 106 also stores information, such as a signature, for comparing with a signature written to a non-volatile memory 108 (described below) to indicate a successful flush of the cache memory 104 to the non-volatile memory 108, as described below.

The CPU subsystem 112 receives host computer I/O requests from the host interface 118 and processes the requests. Processing the requests may include various functions. For example, the host I/O request specifies a logical block number and number of blocks of data to be transferred to or from the redundant array; however, these logical blocks and number of blocks do not typically correspond to the appropriate physical block numbers and number of blocks on the physical disks comprising the redundant array. Therefore, the logical block number specified in the host I/O request must be translated into the appropriate physical block number, number of blocks, and disk to be used in performing one or more data transfers between the RAID controller 100 and the disks comprising the redundant array. This translation function is performed by the CPU subsystem 112. In one embodiment, the CPU subsystem 112 performs the translation according to well-known RAID techniques. After performing the translation, the CPU subsystem 112 programs the disk interface 116 to perform the data transfers between the disks and the volatile cache memory 104. Additionally, the CPU subsystem 112 programs the host interface 118 to perform data transfers between the host computers and the volatile cache memory 104. Thus, when processing a host I/O request to write data from a host computer to a redundant array, the CPU subsystem 112 programs the host interface 118 to transfer data from the host computer to the volatile cache memory 104; after the data is received into the volatile cache memory 104, the CPU subsystem 112 programs the disk interface 116 to transfer the data from the volatile cache memory 104 to the translated appropriate physical block numbers of the disks comprising the redundant array. Conversely, when processing a host I/O request to read data from a redundant array to a host computer, the CPU subsystem 112 programs the disk interface 116 to transfer the data to the volatile cache memory 104 from the translated appropriate physical block numbers of the disks comprising the redundant array; after the data is received into the volatile cache memory 104, the CPU subsystem 112 programs the host interface 118 to transfer the data to the host computer from the volatile cache memory 104. The CPU subsystem 112 also performs the function of managing allocation of portions of the volatile cache memory 104 for performing the data transfers, and in particular of cache management, i.e., managing the volatile cache memory 104 as a cache memory for caching portions of the data buffered in volatile cache memory 104 in order to improve I/O performance between the redundant arrays and the host computers according to well-known caching techniques. In one embodiment, the CPU subsystem 112 performs exclusive-OR operations of the data required in certain RAID levels that employ parity data as the redundant data, such as RAID level 5, for example. In one embodiment, the CPU subsystem 112 programs a dedicated exclusive-OR circuit comprised within the memory controller 102 to perform the exclusive-OR operation on the user data to generate the redundant parity data.

The RAID controller 100 also includes a non-volatile memory 108. The non-volatile memory 108 is non-volatile because it continues to store its data when it is not powered. In one embodiment, the non-volatile memory 108 comprises a Compact FLASH memory device comprising NAND Flash devices and a controller that presents an ATA interface to a memory controller 102 (which is described below). Embodiments in which the non-volatile memory 108 comprises 256 MB, 512 MB, and 1 GB contemplated; however, other embodiments are contemplated in which more or less non-volatile memory 108 is included on the RAID controller 100. In one embodiment, the non-volatile memory 108 comprises a micro-disk drive. The non-volatile memory 108 is used by the RAID controller 100 to backup, or flush, the contents of the volatile cache memory 104, particularly the posted-write data, in response to a loss of main power so that when main power returns the posted-write data may be restored from the non-volatile memory 108 to the volatile cache memory 104.

The RAID controller 100 also includes a memory controller 102, coupled to the disk interface 116, host interface 118, cache memory 104, and non-volatile memory 108. The memory controller 102 controls accesses by the disk interface 116, host interface 118, and CPU subsystem 112 to the cache memory 104 and non-volatile memory 108. In one embodiment, the memory controller 102 also functions as a bus bridge for bridging communications between the volatile cache memory 104 bus, the non-volatile memory 108 bus, the CPU subsystem 112 bus, and the host interface 118 and disk interface 116 buses. In one embodiment, the memory controller 102 is a custom large scale integrated circuit. In one embodiment, the memory controller 102 comprises a custom programmable logic device. The memory controller 102 is described in more detail below with respect to FIG. 2.

During normal operation, the RAID controller 100 receives power from a main power source external to the RAID controller 100, including but not limited to a common commercially-supplied A/C power source, as is well known in the art of power supplying. However, the RAID controller 100 also includes one or more capacitors 136 for supplying power to the RAID controller 100 in the event of a loss of main power, as described in more detail below. If some or all of the charge, or energy store, on the capacitors 136 is depleted because of a main power outage, the capacitors 136 are re-charged from the main power source once main power is restored. In one embodiment, the capacitors 136 employ Aerogel carbon technology as an active material and are configured as an array of parallel capacitors in a single package. In one embodiment, the capacitors 136 comprise four model B1860-2R5107 PowerStor B Series Aerogel Supercapacitors manufactured by Cooper Bussman of Boynton Beach, Fla., a division of Cooper Industries. However, other embodiments are contemplated, and the present invention is not limited to a particular capacitor model or capacitor technology.

The RAID controller 100 also includes a power regulator 134, coupled to receive power from both the capacitors 136 and the main power source. The power regulator 134 senses whether the main power source is supplying power, and if so, regulates the main power source to provide power to the various RAID controller 100 circuits. If the main power source is not supplying adequate power, the power regulator 134 regulates the capacitors 136 to provide power to a subset of the RAID controller 100 circuits, as described in more detail below.

The RAID controller 100 also includes a power manager 132, coupled to the power regulator 134 and to the memory controller 102. The power manager 132 also senses whether the main power source is supplying power. If the power manager 132 senses a loss of main power, the power manager 132 selectively instructs the memory controller 102 to flush the posted-write data from the cache memory 104 to the non-volatile memory 108, as described in detail below. In one embodiment, the power manager 132 comprises a micro-complex programmable logic device (CPLD) that consumes very low power. Additionally, other circuits may be employed to perform the functions described herein that are performed by the power manager 132, such as custom integrated circuits or discrete components.

In the embodiment of FIG. 1, when main power is lost, the capacitors 136 supply power only to the cache memory 104, the non-volatile memory 108, the memory controller 102, and power manager 132, and other circuits required to keep those circuits operational, such as bus terminators of the high-speed memory bus coupling the memory controller 102 to the cache memory 104. That is, the capacitors 136 supply power only to the circuits required to perform the flush operation of the posted-write data from the cache memory 104 to the non-volatile memory 108. Advantageously, the capacitors 136 do not supply power to the circuits not required to perform the flush, namely the CPU subsystem 112, disk interface 116, host interface 118, and unneeded portions of the memory controller 102, such as the portions for interfacing with the CPU subsystem 112, disk interface 116, and host interface 118.

In the present disclosure, a flush operation refers to a copying of data from the cache memory 104 to the non-volatile memory 108 in response to a loss of main power, whereas a restore operation refers to a copying of data from the non-volatile memory 108 to the cache memory 104 after main power is restored. The RAID controller 100 selectively performs a restore operation when main power is restored, as described below.

Figure 2:
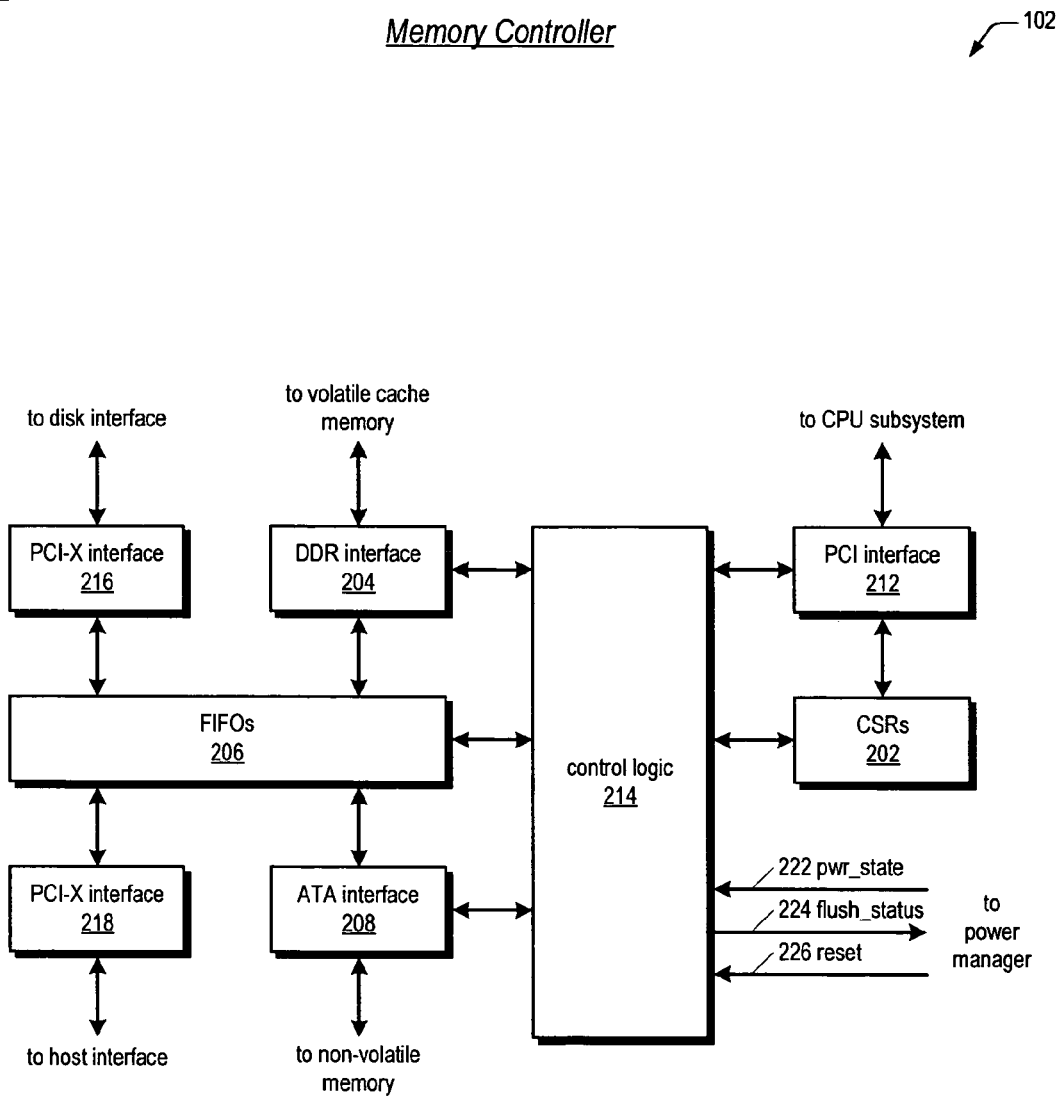
FIG. 2 is a block diagram illustrating in more detail the memory controller of FIG. 1 according to the present invention.

Referring now to FIG. 2, a block diagram illustrating in more detail the memory controller 102 of FIG. 1 according to the present invention is shown. The memory controller 102 includes control logic 214 for controlling various portions of the memory controller 102. In one embodiment, the control logic 214 includes a direct memory access controller (DMAC) that copies the data from the volatile cache memory 104 to the non-volatile memory 108 during the flush operation.

The control logic 214 receives a reset signal 226 from the power manager 132 of FIG. 1. When the power manager 132 asserts the reset signal 226, the memory controller 102 is reset. The power manager 132 is configured to selectively reset the cache memory 104 in such a manner that when the RAID controller 100 is reset or when main power is restored, if the contents of the cache memory 104 are still valid, the memory controller 102 does not invalidate the contents of the cache memory 104. For example, if the cache memory 104 is in the process of performing a flush operation, the power manager 132 does not reset the memory controller 102, thereby enabling the CPU subsystem 112 to gracefully abort the flush operation, as described below.

The control logic 214 also receives a pwr_state signal 222 from the power manager 132. The power manager 132 instructs the memory controller 102 to perform actions via the pwr_state signal 222 as described in Table 1 below. In particular, the power manager 132 instructs the memory controller 102 to flush the cache memory 104 contents to the non-volatile memory 108 with one value of the pwr_state signal 222 and instructs the memory controller 102 to place the cache memory 104 into self-refresh mode with another value of the pwr_state signal 222, in response to different events, such as a loss of main power or completion of a flush operation, as discussed below.

TABLE 1

PWR_STATE Signal

00 Reserved.
01 Flush cache memory to non-volatile memory.
   Complete transactions on PCI-X buses then disable PCI-X operation.
   Flush internal FIFOs to cache memory. Initiate DMA operation to
   flush cache memory data specified in CSRs to non-volatile memory
   via ATA interface.
10 Place cache memory into self-refresh mode.
   Complete transactions on PCI-X buses then disable PCI-X operation.
   Flush internal FIFOs to cache memory then place the cache memory
   into self-refresh mode.
11 Normal operation.
   Allow normal data transfers on all buses.

The control logic 214 also provides a flush_status signal 224 to the power manger 132. The memory controller 102 provides the power manager 132 with the current cache memory 104 to non-volatile memory 108 flush state via the flush_status signal 224 as described in Table 2 below. In particular, the memory controller 102 indicates to the power manager 132 via the flush_status signal 224 whether or not a flush operation is in progress, and whether or not a flush operation has completed with or without errors.

TABLE 2

FLUSH_STATUS Signal

00 Non-Flush Operation. Normal memory controller operation.
01 Flush In-Progress.
10 Flush Completed With Errors (ECC, ATA, or Aborted.)
11 Flush Completed Successfully The memory controller 102 also includes a local bus interface 216 (such as a PCI-X interface) for interfacing the memory controller 102 to the disk interface 116; another local bus interface 218 (such as a PCI-X interface) for interfacing the memory controller 102 to the host interface 118; a memory bus interface 204 (such as a DDR SDRAM interface) for interfacing the memory controller 102 to the cache memory 104; and an ATA interface 208 for interfacing the memory controller 102 to the non-volatile memory 108. The local bus interfaces 216 and 218, memory bus interface 204, and ATA interface 208 are all coupled to the control logic 214 and are also coupled to buffers 206 (such as first-in-first-out (FIFO) buffers) that buffer data transfers between the various interfaces and provide parallel high-speed data paths therebetween. In one embodiment, the ATA interface 208 supports ATA PIO Mode-4 and a data transfer rate of up to 16.7 MB/second.

The memory controller 102 also includes a local bus interface 212, such as a PCI interface, coupled to the control logic 214, for interfacing the memory controller 102 to the CPU subsystem 112. The CPU subsystem 112 accesses the cache memory 104, non-volatile memory 108, disk interface 116, and host interface 118 via the PCI interface 212.

The memory controller 102 also includes control and status registers (CSRs) 202, coupled to the local bus interface 212 and to the control logic 214. The CSRs 202 are programmable by the CPU subsystem 112 of FIG. 1 to control the memory controller 102 and are readable by the CPU subsystem 112 for the memory controller 102 to provide status to the CPU subsystem 112. Among the CSRs 202 are control registers that enable the CPU subsystem 112 to specify the location and size of one or more regions of data, such as posted-write data, in the cache memory 104 which the memory controller 102 is to flush to the non-volatile memory 108 when main power is lost. The CSRs 202 are described in detail below with respect to FIG. 3.

Referring now to FIG. 3, a block diagram illustrating the CSRs 202 of FIG. 2 according to the present invention is shown. The various CSRs 202 and their contents are described in the text and Tables below.

The NVB_FLUSH_CTRL Register 302 provides the CPU subsystem 112 the ability to initiate a flush operation similar to the ability of the power manager 132 to initiate a flush operation via the pwr_state signal 222, and provides the CPU subsystem 112 the ability to read the status of a flush operation similar to the ability of the power manager 132 to read the flush operation status via the flush_status signal 224. When main power is restored and the CPU subsystem 112 software boots, a flush operation may still be in progress and the cache memory 104 contents may still be valid. Consequently, in one embodiment, the CPU subsystem 112 may command the memory controller 102 to abort an in-progress flush operation (since the cache memory 104 contents may still be valid) by writing a 0 to the FLUSH_START bit in the NVB_FLUSH_CTRL Register 302 as described in Table 3.

TABLE 3

NVB_FLUSH_CTRL Register

| Bits | R/W | Reset | Name | Description |
|---|---|---|---|---|
| 31:4 | RO | 0 | | Reserved |
| 3 | RO | | AUTO_START | 0 if Flush operation initiated by SW<br>1 if Flush operation initiated by HW (pin)<br>This bit is set when a flush is started and will remain set until a new flush is initiated. |
| 2:1 | RO | 0 | FLUSH_STATUS | Provides status of data flush operation.<br>00 - No Data Flush<br>01 - Data Flush in-progress<br>10 - Data Flush Completed with Errors (ECC, ATA, or Aborted)<br>11 - Data Flush Completed Successfully |
| 0 | RW | 0 | FLUSH_START | Writing "1" to this register initiates data flush operation. The external PWR_STATE pins will also set this bit. When the flush is complete, this bit will reset back to 0. Writing "0" while the flush is going aborts the operation (aborts on next 512 byte boundary). After an abort the ATA device may need to be reset as it is left in an unknown state. |

The NVB_RESTORE_CTRL Register 304 provides the CPU subsystem 112 the ability to initiate a restore operation from non-volatile memory 108 to cache memory 104, and provides the CPU subsystem 112 the ability to read the status of a restore operation.

TABLE 4

NYB_RESTORE_CTRL Register

| Bits | R/W | Reset | Name | Description |
|---|---|---|---|---|
| 31:3 | RO | 0 | | Reserved |
| 2:1 | RO | 0 | RESTORE_STATUS | Provides status of data restore operation.<br>00 - No Restore in progress<br>01 - Data Restore in progress<br>10 - Data Restore Completed with Errors (ECC, ATA, or Aborted)<br>11 - Data Restore Completed without Errors |
| 0 | RW | 0 | RESTORE_START | Writing "1" to this register initiates data restore operation. When the restore is complete, this bit will reset back to 0. Writing "0" while the restore is going aborts the operation (aborts on next 512 byte boundary). After an abort the ATA device may need to be reset as it is left in an unknown state. |

The NVB_RAM_START_ADDR1 Register 306 specifies the starting address in the cache memory 104 of a first region of data that is the source or sink of a flush or restore operation, respectively.

TABLE 5

NVB_RAM_START_ADDR1 Register

| Bits | R/W | Reset | Name | Description |
|---|---|---|---|---|
| 31 | RO | 0 | | Reserved |
| 30:9 | RW | 0 | NVB_RAM_START_ADDR1 | Starting cache memory address used for a flush or restore operation for Region 1. |
| 8:0 | RO | 0 | | Reserved |

The NVB_ATA_START_ADDR1 Register 308 specifies the starting address in the non-volatile memory 108 of the first region of data that is the sink or source of a flush or restore operation, respectively. In one embodiment, the memory controller 102 converts the non-volatile memory 108 address specified in the NVB_ATA_START_ADDR1 Register 308 to a sector number if the non-volatile memory 108 is a sectored ATA device.

TABLE 6

NVB_ATA_START_ADDR1 Register

| Bits | R/W | Reset | Name | Description |
|---|---|---|---|---|
| 31 | RO | 0 | | Reserved |
| 30:9 | RW | 0 | NVB_ATA_START_ADDR1 | Starting non-volatile memory address used for a flush or restore operation for Region 1. |
| 8:0 | RO | 0 | | Reserved |

The NVB_SIZE1 Register 312 specifies the total size, or length, of the first region of data that is to be copied by a flush or restore operation.

TABLE 7

NVB_SIZE1 Register

| Bits | R/W | Reset | Name | Description |
|---|---|---|---|---|
| 31 | RO | 0 | | Reserved |
| 30:9 | RW | 0 | NVB_SIZE1 | Total size (length) of a flush or restore operation of Region 1. |
| 8:0 | RO | 0 | | Reserved |

The NVB_RAM_START_ADDR2 Register 314 specifies the starting address in the cache memory 104 of a second region of data that is the source or sink of a flush or restore operation, respectively.

TABLE 8

NVB_RAM_START_ADDR2 Register

| Bits | R/W | Reset | Name | Description |
|---|---|---|---|---|
| 31 | RO | 0 | | Reserved |
| 30:9 | RW | 0 | NVB_RAM_START_ADDR2 | Starting cache memory address used for flush or restore operation for Region 2. |
| 8:0 | RO | 0 | | Reserved |

The NVB_ATA_START_ADDR2 Register 316 specifies the starting address in the non-volatile memory 108 of the second region of data that is the sink or source of a flush or restore operation, respectively. In one embodiment, the memory controller 102 converts the non-volatile memory 108 address specified in the NVB_ATA_START_ADDR2 Register 316 to a sector number if the non-volatile memory 108 is a sectored ATA device.

TABLE 9

NVB_ATA_START_ADDR2 Register

| Bits | R/W | Reset | Name | Description |
|---|---|---|---|---|
| 31 | RO | 0 | | Reserved |
| 30:9 | RW | 0 | NVB_ATA_START_ADDR2 | Starting non-volatile memory address used for a flush or restore operation for Region 2. |
| 8:0 | RO | 0 | | Reserved |

The NVB_SIZE2 Register 318 specifies the total size, or length, of the second region of data that is to be copied by a flush or restore operation.

TABLE 10

NVB_SIZE2 Register

| Bits | R/W | Reset | Name | Description |
|---|---|---|---|---|
| 31 | RO | 0 | | Reserved |
| 30:9 | RW | 0 | NVB_SIZE2 | Total size (length) of a flush or restore operation of Region 2. |
| 8:0 | RO | 0 | | Reserved |

The NVB_SECTOR_COUNT Register 322 specifies the number of sectors to use for each write/read command issued by the memory controller 102 to the non-volatile memory 108 ATA device. The NVB_SECTOR_COUNT Register 322 may be used to optimize the speed of the flush and restore operations to and from the non-volatile memory 108 ATA device. The NVB_SECTOR_COUNT Register 322 is used in conjunction with the NVB_SIZE Register 312/318. For example, the CPU subsystem 112 may program the NVB_SIZE Register 312/318 with a value of 256 KB and the NVB_SECTOR_COUNT Register 322 with a value of 32, resulting in the 256 KB of data being written as 16 write commands of 32 sectors (16 KB) each. The NVB_SIZE Register 312/318 must be programmed with a value that is a multiple of the NVB_SECTOR_COUNT Register 322 value.

TABLE 11

NVB_SECTOR_COUNT Register

| Bits | R/W | Reset | Name | Description |
|---|---|---|---|---|
| 31:9 | RO | 0 | | Reserved |
| 8:0 | RW | 1 | NVB_SECTOR_COUNT | Non-volatile memory Sector Count. Number of sectors to use for each Write/Read command issued to ATA device. The allowable values are: 0x000 1 sector, 0x001 1 sector, 0x002 2 sectors, 0x004 4 sectors, 0x008 8 sectors, 0x010 16 sectors, 0x020 32 sectors, 0x040 64 sectors, 0x080 128 sectors, 0x100 256 sectors |

The NVB_PROGRESS Register 324 specifies the current address in the cache memory 104 being read from or written to during a flush operation or restore operation, respectively. The NVB_PROGRESS Register 324 is valid only when a flush or restore operation is in progress. The NVB_PROGRESS Register 324 enables the CPU subsystem 112 to assess the progress of a flush or restore operation. If the flush or restore operation generates an error, the NVB_PROGRESS Register 324 value specifies the approximate address where the error occurred. If a flush or restore operation is aborted, the NVB_PROGRESS Register 324 will have incremented to the next sector after the abort occurs.

TABLE 12

NVB_PROGRESS Register

| Bits | R/W | Reset | Name | Description |
|---|---|---|---|---|
| 31 | RO | 0 | | Reserved |
| 30:4 | RO | 0 | NVB_PROGRESS | Current non-volatile memory flush or Restore Address. This value is only valid during a flush or restore operation. |
| 3:0 | RO | 0 | | Reserved |

The ATA_INT_STATUS Register 326 may be read by the CPU subsystem 112 to determine whether the non-volatile memory 108 ATA device has generated an interrupt, such as upon the successful read or write of one or more sectors of data during a flush or restore operation, and to determine whether a flush or restore operation has completed. The ATA_INT_STATUS Register 326 also enables the CPU subsystem 112 to clear the interrupt source.

TABLE 13

ATA_INT_STATUS Register

| Bits | R/W | Reset | Name | Description |
|---|---|---|---|---|
| 31:3 | RO | 0 | | Reserved |
| 2 | RO | 0 | ATA_DEVICE_INT | ATA Device Interrupt. This bit reflects the status of the non-volatile memory ATA device interrupt line (1 = asserted). |
| 1 | RW1C | 0 | RESTORE_DONE_INT | Restore Operation Done. This bit will be set to one when a Restore operation completes. If the corresponding bit in the ATA_INT_ENABLE register is also set, then an ATA_IRQ will be generated. Writing a one to this bit location will clear the bit (and interrupt) as will starting a new Restore operation. |
| 0 | RW1C | 0 | FLUSH_DONE_INT | Flush Operation Done. This bit will be set to one when a flush operation completes. If the corresponding bit in the ATA_INT_ENABLE register is also set, then an ATA_IRQ will be generated. Writing a one to this bit location will clear the bit (and interrupt) as will starting a new flush operation. |

The ATA_INT_ENABLE Register 328 enables the CPU subsystem 112 to enable or disable interrupt sources specified by the ATA_INT_STATUS Register 326.

TABLE 14

ATA_INT_ENABLE Register

| Bits | R/W | Reset | Name | Description |
|---|---|---|---|---|
| 31:3 | RO | 0 | | Reserved |
| 2 | RW | 0 | ATA_DEVICE_INT_EN | ATA Device Interrupt Enable. When set to one, the ATA Device interrupt will generate an ATA_IRQ interrupt. |
| 1 | RW | 0 | RESTORE_DONE_INT_EN | Restore Operation Done Interrupt Enable. When set to one, the Restore Done interrupt will generate an ATA_IRQ interrupt |
| 0 | RW | 0 | FLUSH_DONE_INT_EN | Flush Operation Done Interrupt Enable. When set to one, the Flush Done interrupt will generate an ATA_IRQ interrupt |

The NVB_ERROR_CODE Register 332 specifies the error type when a flush or restore operation completes if the NVB_FLUSH_CTRL Register 302 or NVB_RESTORE_CTRL Register 304 indicates a failure. When an ECC error is detected, the operation terminates at the next sector boundary. Consequently, up to 512 bytes may be transferred after the error occurs. In one embodiment, the CPU subsystem 112 has the ability to cause ECC errors to be ignored. Hardware detection of ATA device errors is performed by checking the contents of the ATA Device Status register, which is a Task File register in the ATA Direct Access Registers 342 discussed below. The memory controller 102 reads the ATA Device Status register after issuing the ATA command and after the transfer of each sector completes. Consequently, ATA device errors are detected and reported at the sector boundary where the error occurs, i.e., up to 512 bytes may transfer after the ATA error actually occurs. Likewise, ATA operations terminate only at a sector boundary.

TABLE 15

NVB_ERROR_CODE Register

| Bits | R/W | Reset | Name | Description |
|---|---|---|---|---|
| 31:9 | RO | 0 | | Reserved |
| 8 | RO | 0 | NVB_ERROR_TYPE | 0 = ATA Device Error (or no error if no failure) 1 = DDR SDRAM uncorrectable error |
| 7:0 | RO | 0 | ATA_ERROR_CODE | ATA device status register Bit 7: BUSY Bit 6: RDY Bit 5: DWF - Write Fault occurred Bit 4: DSC Bit 3: DRQ Bit 2: CORR Bit 1: IDX (always 0) Bit 0: ERR - Command ended in error specified in ATA Device Error Task File register |

The NVB_CONFIG Register 334 enables the CPU subsystem 112 to configure aspects of a flush operation. In particular, the CPU subsystem 112 may enable the memory controller 102 to automatically perform a flush operation or may disable the memory controller 102 from automatically performing a flush operation. Additionally, the CPU subsystem 112 may selectively instruct the memory controller 102 via the NVB_CONFIG Register 334 to write to the non-volatile memory 108 information specifying the results of a flush operation when the flush operation ends, whether the flush was successful or was aborted or an error occurred, as described below. The memory controller 102 writes the flush results information to a predetermined flush results sector of the non-volatile memory 108 ATA device. In one embodiment, the flush results sector is the first sector of the non-volatile memory 108.

TABLE 16

NVB_CONFIG Register

| Bits | R/W | Reset | Name | Description |
|------|-----|-------|------|-------------|
| 31:2 | RO | 0 | | Reserved |
| 1 | R/W | 0 | WR_FLUSH_RESULTS_EN | Enable bit to allow the results of the Flush Operation to be written back to the first sector of the NVB memory. See below for format. |
| 0 | R/W | 0 | AUTO_FLUSH_EN | Enable bit for the Automatic Flush on power-down. 1 = enabled. 0 = disabled. If enabled, when an auto flush operation completes (success, fail or aborted), this bit will be cleared. |

The ATA_RESET Register 336 enables the CPU subsystem 112 to reset the non-volatile memory 108 ATA device.

TABLE 17

ATA_RESET Register

| Bits | R/W | Reset | Name | Description |
|------|-----|-------|------|-------------|
| 31:1 | RO | 0 | | Reserved |
| 0 | R/W | 0 | ATA_RESET | When this bit is 1 the ATA device will be held in reset. 0 allows normal operation. |

The ATA_CRC Register 338 contains the 32-bit CRC for the data when a flush or restore operation is completed. The CRC data is automatically written to the write results sector if the option is enabled. In one embodiment, a flush operation writes the CRC value to the write results sector and when a restore operation is performed, the CRC value is compared to the ATA_CRC Register 338 value to determine if any data corruption occurred during the flush or restore operation, indicated by a mismatch.

TABLE 18

ATA_CRC Register

| Bits | R/W | Reset | Name | Description |
|------|-----|-------|------|-------------|
| 31:0 | RO | 0xFFFFFFFF | ATA_CRC | CRC of the last Flush or Restore operation. The CRC is a 32 bit CRC using 16 bit input. The starting value is 0xFFFFFFFF (preset). The polynomial is: $x^{32} + x^{26} + x^{23} + x^{22} + x^{16} + x^{12} + x^{11} + x^{10} + x^8 + x^7 + x^5 + x^4 + x^2 + x + 1$ (IEEE 802.3 CRC-32 polynomial) however, the final result is not complemented. |

The format of the flush results information written to the non-volatile memory 108 ATA device flush results sector is described in Table 19 below.

TABLE 19

Flush Results Sector Format

| Byte Offset | Name | Value |
|-------------|------|-------|
| 0 | Completion Signature | 0x13AC |
| 2 | Completion Status | 0x0002 (if completion with errors or aborted) 0x0003 (if successful completion) |
| 4 | Completion Error Code | Same value as NVB_ERROR_CODE Register |
| 6 | High Half of CRC | 0xXXXX |
| 8 | Low Half of CRC | 0xXXXX |
| 10 | Reserved | 0x00000000 |
| 14 | Sector Pad Bytes | 0xFF (remainder of sector has this value) |

The Completion Signature value is also stored in the code FLASH 106 so that the CPU subsystem 112 can compare it with the Completion Signature in the non-volatile memory 108 flush results sector to determine whether a flush operation was successful. Additionally, in one embodiment, the memory controller 102 computes a running cyclic redundancy code (CRC) of the data as it flushes the data to the non-e volatile memory 108, and writes the final CRC value to the flush results sector at the offset shown in Table 19. This enables the CPU subsystem 112 to generate a CRC when reading the data during a restore operation to verify that the data is valid, i.e., that the data was accurately written to the non-volatile memory 108 by the flush operation, by comparing with the ATA_CRC Register 338 value.

The ATA Direct Access Registers 342 comprise control and status registers used by the CPU subsystem 112 to communicate with the non-volatile memory 108 ATA device. In one embodiment, the ATA Direct Access Registers 342 comprise a standard ATA register file, commonly known as a Task File, which is well-known in the art of disk drives. The memory controller 102 reads and writes the ATA Direct Access Registers 342 to perform ATA commands with the non-volatile memory 108 ATA device such as writes of posted-write data during a flush operation and reads of the data during a restore operation. The CPU subsystem 112 may also directly access the ATA Direct Access Registers 342.

Figure 4:
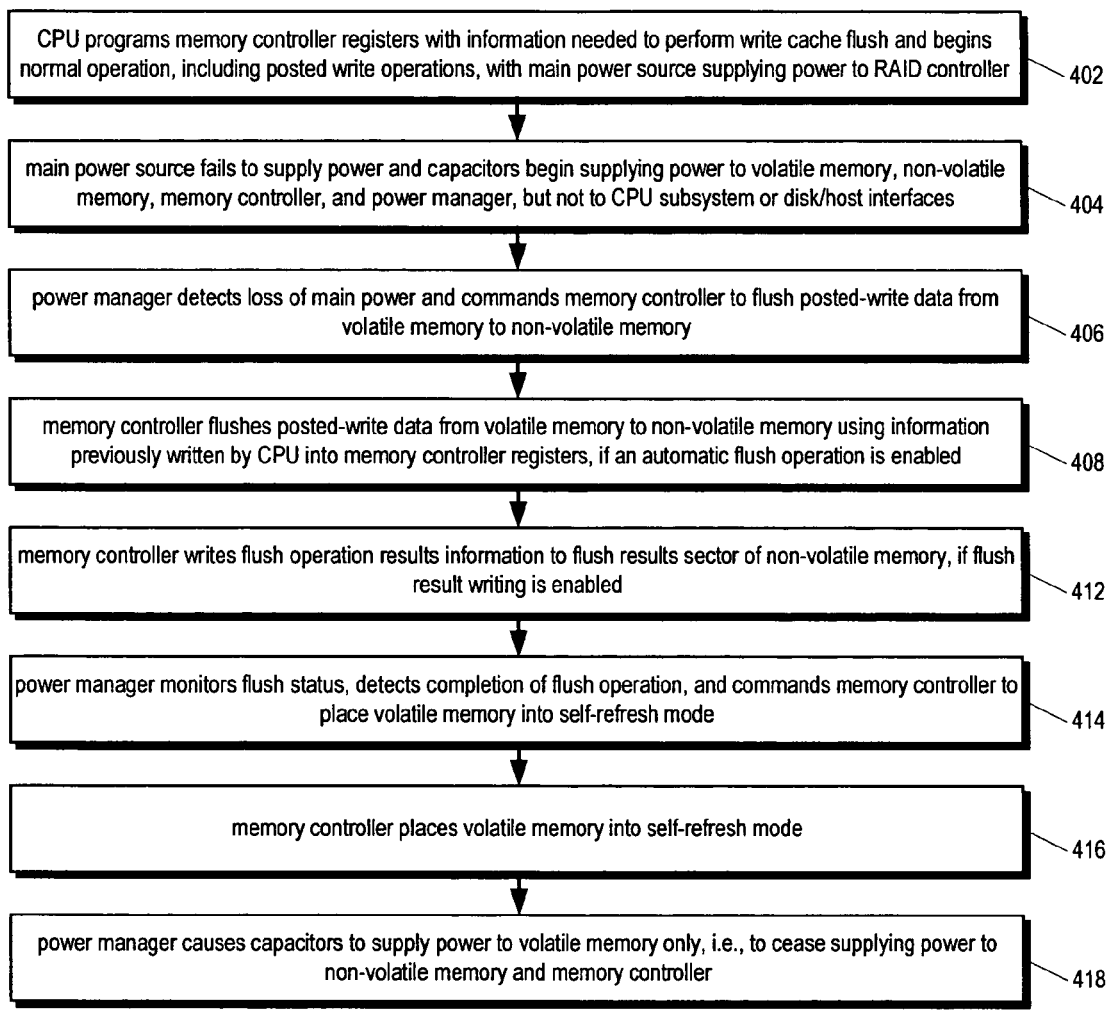
FIG. 4 is a flowchart illustrating operation of the RAID controller of FIG. 1 to perform a flush operation according to the present invention.

Referring now to FIG. 4, a flowchart illustrating operation of the RAID controller 100 of FIG. 1 to perform a flush operation according to the present invention is shown. Flow begins at block 402.

At block 402, the CPU subsystem 112 programs the memory controller 102 CSRs 202 of FIG. 3 with the information needed by the memory controller 102 to perform an automatic flush operation. Preferably, the CPU subsystem 112 software performs this function as part of its initialization sequence during boot up. In particular, the CPU subsystem 112 programs the NVB_FLUSH_CTRL Register 302, the NVB_RAM_START_ADDR1 Register 306, the NVB_ATA_START_ADDR1 Register 308, the NVB_SIZE1 Register 312, the NVB_RAM_START_ADDR2 Register 314, the NVB_ATA_START_ADDR2 Register 316, the NVB_SIZE2 Register 318, the NVB_SECTOR_COUNT Register 322, the ATA_INT_ENABLE Register 328, and the NVB_CONFIG Register 334 with the desired values to provide the memory controller 102 with the necessary information to perform a flush operation. In one embodiment, the CPU subsystem 112 programs the memory controller 102 to flush all cached data, i.e., posted-write data and read-cached data; however, in another embodiment, the CPU subsystem 112 programs the memory controller 102 to include only posted-write data, thereby reducing the amount of energy and time required to perform the flush operation. In addition, the CPU subsystem 112 may initialize the flush results sector to a predetermined value in order to enable the CPU subsystem 112 to determine whether the memory controller 102 successfully wrote the flush operation results information to the flush results sector at the end of a flush operation. For example, in one embodiment, the CPU subsystem 112 writes or erases the flush results sector with a value of 0xFF for each byte in the sector. The CPU subsystem 112 subsequently begins normal operation while the main power source supplies power to the RAID controller 100. Normal operation includes performing posted write operations, causing posted-write data to be stored into the volatile cache memory 104. Flow proceeds to block 404.

At block 404, the main power source fails to supply power to the RAID controller 100. In response, the capacitors 136 begin supplying power to the predetermined portions of the RAID controller 100, namely to the cache memory 104, the non-volatile memory 108, the memory controller 102, the power manager 132, and power regulator 134 and related circuitry. In particular, the capacitors 136 do not supply power to the CPU subsystem 112, disk interface 116, or host interface 118. Additionally, the PCI-X interfaces 216 and 218 and FIFOs 206 that are not needed because they are used only to interface with the disk interface 116 and host interface 118 are not powered by the capacitors 136. Consequently, advantageously, the CPU subsystem 112, disk interface 116, host interface 118 and unneeded portions of the memory controller 102 do not consume energy during the flush operation, thereby enabling the RAID controller 100 to employ capacitors 136 capable of storing less energy, which typically implies capacitors 136 that are less expensive and/or require less space. Additionally, the fact that the CPU subsystem 112, disk interface 116, and host interface 118 do not consume energy stored in the capacitors 136 leaves more energy stored in the capacitors 136 once the flush operation is complete, which increases the likelihood that the capacitors 136 will continue to supply power to the cache memory 104 after the flush is complete thereby keeping the posted-write data intact, which may alleviate the need for a restore operation when the main power is restored, as described below. Flow proceeds to block 406.

At block 406, the power manager 132 detects the loss of main power and commands the memory controller 102 via the pwr_state signal 222 to begin a flush operation of data from the cache memory 104 to the non-volatile memory 108. Flow proceeds to block 408.

At block 408, if the AUTO_FLUSH_EN bit in the NVB_CONFIG Register 334 is set, then the memory controller 102 performs a flush operation based on the information previously programmed into the CSRs 202 at block 402. In particular, the memory controller 102 copies the data in the two regions specified by the NVB_RAM_START_ADDR1 Register 306/NVB_SIZE1 Register 312 and NVB_RAM_START_ADDR2 Register 314/NVB_SIZE2 Register 318 to the two locations in the non-volatile memory 108 specified by the NVB_ATA_START_ADDR1 Register 308 and NVB_ATA_START_ADDR2 Register 316, respectively, in a manner specified by the NVB_SECTOR_COUNT Register 322 and the ATA_INT_ENABLE Register 328. In one embodiment, the first region includes the portion of the posted-write data that includes the actual user data, and the second region includes the portion of the posted-write data that is metadata. In another embodiment, the first region includes the posted-write user data and associated metadata, and the second region includes read-cached user data and associated metadata. However, the use of the two regions is not limited to these embodiments. Furthermore, embodiments are contemplated in which the CSRs 202 include registers for specifying more or less than two data regions. Flow proceeds to block 412.

At block 412, if the WR_FLUSH_RESULTS_EN bit in the NVB_CONFIG Register 334 is set, then the memory controller 102 writes the flush results information specified in Table 19 above to the flush results sector of the non-volatile memory 108 at the end of the flush operation, whether the flush operation was successful, was aborted, or was terminated due to an error. If the CPU subsystem 112 aborts a flush (or restore) operation, or if the memory controller 102 detects an ECC or ATA error during the flush (or restore) operation, then the memory controller 102 will terminate the flush (or restore) operation at the next sector boundary. If the WR_FLUSH_RESULTS_EN bit in the NVB_CONFIG Register 334 is set, the memory controller 102 will write the flush results sector and post a Boolean 10 on the flush_status signal 224 and in the FLUSH_STATUS bits of the NVB_FLUSH_CTRL Register 302. If, while the memory controller 102 is writing the flush operation results to the flush results sector itself, the CPU subsystem 112 commands an abort or the memory controller 102 detects an error, the flush operation results may or may not be written successfully to the flush results sector, and if they are written, the flush results information may be unreliable. Flow proceeds to block 414.

At block 414, after the power manager 132 commands the memory controller 102 to initiate the flush operation, the power manager 132 monitors the progress of the flush operation via the flush_status signal 224. When the flush operation completes, the power manager 132 commands the memory controller 102 via the pwr_state signal 222 to place the cache memory 104 into self-refresh mode, in order to reduce the amount of energy stored in the capacitors 136 that is consumed by the cache memory 104. Flow proceeds to block 416.

At block 416, the memory controller 102 places the cache memory 104 into self-refresh mode in response to the command performed by the power manager 132 at block 414. Flow proceeds to block 418.

At block 418, the power manager 132 causes the capacitors 136 to supply power to the cache memory 104 only. That is, the power manager 132 causes the capacitors 136 to no longer supply power to the non-volatile memory 108 and the memory controller 102, in order to reduce the amount of energy stored in the capacitors 136 that is consumed while waiting until main power is restored. Flow ends at block 418.

Figure 5:
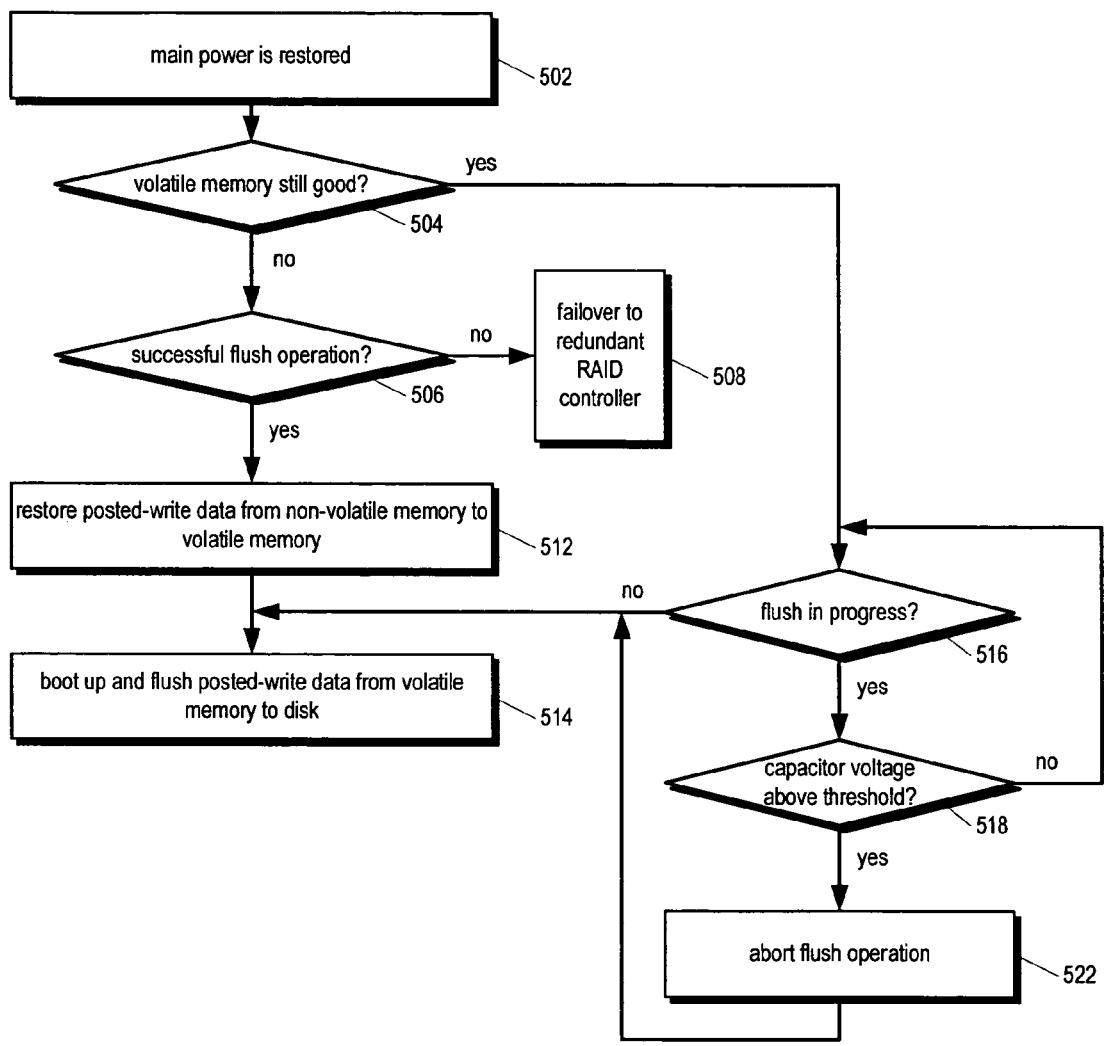
FIG. 5 is a flowchart illustrating operation of the RAID controller of FIG. 1 in response to main power being restored after a failure of main power according to the present invention.

Referring now to FIG. 5, a flowchart illustrating operation of the RAID controller 100 of FIG. 1 in response to main power being restored after a failure of main power according to the present invention is shown. Flow begins at block 502.

At block 502, the main power source resumes supplying power to the RAID controller 100. Consequently, the CPU subsystem 112 software boots up and begins its initialization sequence. Flow proceeds to decision block 504.

At decision block 504, the CPU subsystem 112 determines whether the cache memory 104 contents is still valid. In one embodiment, the CPU subsystem 112 determines whether the cache memory 104 contents is still valid by examining a data good indicator in the power manager 132 that may be written by the memory controller 102. The power manager 132 is configured such that when it is powered up, the data good indicator resets to a predetermined value, such as a Boolean value of zero. Furthermore, the power-off threshold of the power manager 132 is at least as high as the power threshold at which the cache memory 104 begins to lose its data. When main power is lost, the memory controller 102 writes a value into the data good indicator different from the power-up reset value. Thus, if the capacitors 136 fail to supply power to the cache memory 104 (and therefore also fail to supply power to the data good indicator), when main power is restored, the CPU subsystem 112 will read the power-up reset value from the data good indicator rather than the value written by the memory controller 102. Consequently, the CPU subsystem 112 will determine that the cache memory 104 must be restored from the non-volatile memory 108, if the flush operation was successful. However, if the CPU subsystem 112 reads from the data good indicator the value written by the memory controller 102, then the CPU subsystem 112 will determine that it can forego restoring the cache memory 104 thereby making the user data available to the host computers sooner. If the cache memory 104 contents is still valid, flow proceeds to decision block 516; otherwise, flow proceeds to decision block 506.

At decision block 506, the CPU subsystem 112 determines whether a flush operation performed according to FIG. 4 was successfully completed by examining the FLUSH_STATUS bits of the NVB_FLUSH_CTRL Register 302. In one embodiment, the CPU subsystem 112 additionally determines whether the flush operation completed successfully by examining the Completion Status in the flush results sector. In one embodiment, the CPU subsystem 112 additionally determines whether the flush operation completed successfully by comparing the Completion Signature in the flush results sector with the Completion Signature in the code FLASH 106. In one embodiment, the CPU subsystem 112 additionally determines whether the flush operation completed successfully by comparing the CRC in the flush results sector with the CRC computed by reading the data from the non-volatile memory 108. If the flush operation completed successfully, flow proceeds to block 512; otherwise, flow proceeds to block 508.

At block 508, since the posted-write data has been lost, the RAID controller 100 fails over to the partner, i.e., redundant, RAID controller 100 in the system. In one embodiment, during normal operation when a host issues a write I/O request to the RAID controller 100, the posted write data is also written to the partner RAID controller 100. Consequently, if one of the RAID controllers 100 fails, in particular if a flush operation fails on one RAID controller 100, there is a high probability that the flush operation succeeded on the partner RAID controller 100. If so, the partner RAID controller 100 can perform a restore of the posted-write data from its non-volatile memory 108 to the cache memory 104 and subsequently flush the posted-write data to disk. Flow ends at block 508.

At block 512, the CPU subsystem 112 commands the memory controller 102 to perform a restore operation to restore the data flushed from the cache memory 104 to the non-volatile memory 108 during the flush operation described in FIG. 4 back to the cache memory 104. Prior to commanding the memory controller 102 to perform the restore operation, the CPU subsystem 112 programs the appropriate values into the various CSRs 202 of the memory controller 102 needed to perform the restore operation. In one embodiment, the CPU subsystem 112 performs the restore operation, rather than commanding the memory controller 102 to perform the restore operation, by simply reading data from the non-volatile memory 108 and writing the data to the cache memory 104. Because the restore operation is performed while the main power source is supplying power, it is not as crucial that the memory controller 102 perform the restore operation at a lower power consumption level. However, this embodiment has the disadvantage that the CPU subsystem 112 may take longer than the memory controller 102 to complete the restore operation. Flow proceeds to block 514.

At block 514, the CPU subsystem 112 flushes the posted-write data from the cache memory 104 to disk. Flow ends at block 514.

At decision block 516, the CPU subsystem 112 determines whether a flush operation is in progress by reading the FLUSH_STATUS bits of the NVB_FLUSH_CTRL Register 302. If a flush operation is in progress, flow proceeds to decision block 518; otherwise, flow proceeds to block 514.

At decision block 518, the CPU subsystem 112 examines the capacitors 136 voltage level to determine whether the voltage level is above a minimum threshold. In one embodiment, the minimum voltage threshold value is programmed into the CPU subsystem 112 software. In another embodiment, the minimum voltage threshold value is user-programmable via a user configuration program. If the capacitors 136 voltage level is above the minimum threshold, flow returns to decision block 516 to wait until either the flush operation completes or the capacitors 136 voltage reaches the minimum threshold; otherwise, flow proceeds to block 522.

At block 522, the CPU subsystem 112 aborts the flush operation by writing a Boolean 0 to the FLUSH_START bit in the NVB_FLUSH_CTRL Register 302. Flow proceeds to block 514.

The process of waiting to boot the RAID controller 100 and resume normal operations if the cache memory 104 is still good and a flush operation is in progress until either the flush completes or the capacitors 136 voltage level reaches the minimum threshold solves the problem which might exist without the benefit of the additional test at decision block 518, as exemplified by the following sequence of events. Assume the power manager 132 senses the loss of main power and commands the memory controller 102 to perform a flush operation. A significant amount of the capacitors 136 stored energy is consumed by the flush operation. Before the flush operation completes, main power is restored; consequently, the CPU subsystem 112 aborts the flush operation. The CPU subsystem 112 boots up and enables another flush operation in the event of another main power loss. Shortly thereafter, and significantly, while the capacitors 136 are less than fully re-charged, the power manager 132 senses another loss of main power and commands the memory controller 102 to perform another flush operation. The second flush operation consumes again a significant amount of the capacitors 136 stored energy, which began with less than a full charge. If this sequence continues, eventually the capacitors 136 will not have enough energy to complete a successful flush operation, resulting in potential loss of user data. The scenario described above may be induced by periodic brown-outs of the main power supply or possibly by a noisy power supply that cause the power manager 132 to sense that main power is being lost in a relatively periodic fashion in which the period is on the order of the flush operation time. However, advantageously, the additional test at decision block 518 potentially avoids this problem.

In one embodiment, the capacitors 136 comprise a 200 Farad package of four 50 Farad capacitors in series storing 336 Joules of usable energy when fully charged, assuming a 2.0 Volt charged voltage level of each capacitor and a 0.8 Volt cut off voltage, which defines the minimum working voltage for reliable FET gate thresholds and low drop out regulation. In one embodiment, the power consumption of the cache memory 104, non-volatile memory 108, memory controller 102, power manager 132, DDR-SDRAM bus interface termination circuitry, a clocking circuit, and other miscellaneous circuitry requiring power during the flush operation is approximately 4 Watts. The non-volatile memory 108 is capable of being written to at a sustained rate of approximately 10 MB/second. In one embodiment, the size of the cache memory 104 is 1 GB, which comprises approximately 512 MB allocated to storage of posted-write data, and the size of the non-volatile memory 108 is 512 MB. Consequently, the flush operation takes approximately 50 seconds to complete and consumes approximately 200 Joules of energy. In another embodiment, the size of the cache memory 104 is 512 MB, which comprises approximately 256 MB allocated to storage of posted-write data, the size of the non-volatile memory 108 is 256 MB, and the non-volatile memory 108 is capable of being written to at a sustained rate of approximately 7.5 MB/second. Consequently, the flush operation takes approximately 33 seconds to complete and consumes approximately 133 Joules of energy. This is in contrast to the relatively large amount of energy consumed by the CPU subsystem 112 in some embodiments. For example, in one embodiment the CPU subsystem 112 consumes approximately 15 Watts during normal operation; hence, if the CPU subsystem 112 was powered during the flush operation, the capacitors 136 embodiment described above would not be able to provide the required energy for either of the flush operations described above. However, the embodiments described above which do not provide power to the CPU subsystem 112 during the flush operation advantageously enable the flush operation to be performed within the energy storage capabilities of a cost-effective capacitor solution in many applications, such as the capacitors 136 of the embodiments described in this paragraph. However, the present invention is not limited to the capacitors 136 embodiments described herein, but may be adapted to employ capacitors 136 with more or less energy storage capacity and density as needed by the particular RAID controller application.

Figure 6:
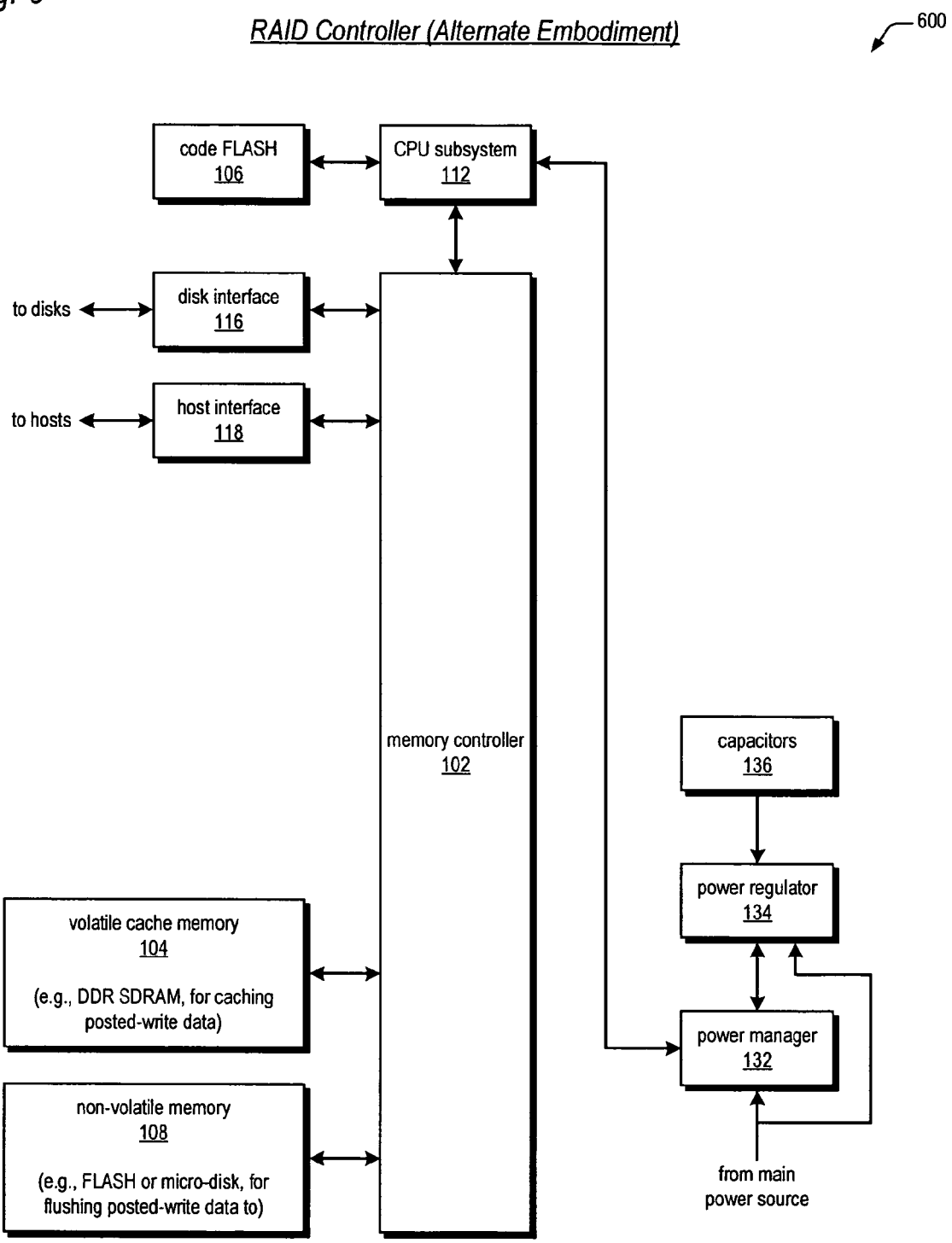
FIG. 6 is a block diagram illustrating a RAID controller according to an alternate embodiment of the present invention.
Figure 7:
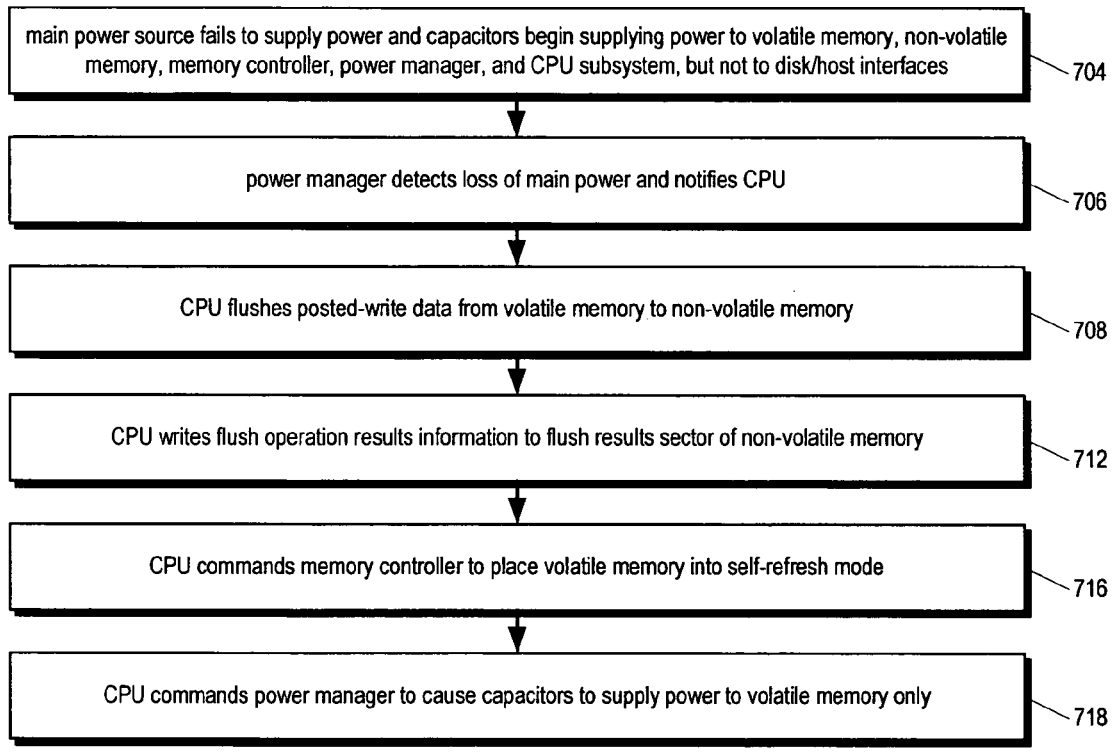
FIG. 7 is a flowchart illustrating operation of the RAID controller of FIG. 6 to perform a flush operation according to an alternate embodiment of the present invention.

Although embodiments have been described in which the memory controller is employed to perform the posted-write data flush from volatile memory to non-volatile memory, embodiments are contemplated in which the CPU performs the flush from volatile memory to non-volatile memory, as illustrated in FIGS. 6 and 7. The embodiment of FIGS. 6 and 7 which use the CPU subsystem 112 to perform the flush operation may be a viable embodiment if one or more of the following in combination is true: the energy density of the capacitors 136 is sufficiently high to store the energy needed by the RAID controller 100, including the CPU subsystem 112, to perform the flush operation; the available space allocated for the capacitors 136 on the RAID controller 100 is sufficiently great to use enough capacitors 136 to store the energy needed by the RAID controller 100, including the CPU subsystem 112, to perform the flush operation; the CPU subsystem 112 consumes a small enough amount of power such that the capacitors 136 can store the energy needed by the RAID controller 100, including the CPU subsystem 112, to perform the flush operation. Although this embodiment may consume more energy than the embodiments described in FIGS. 1 through 5, if the capacitors 136 are able to supply the required energy, then the RAID controller 100 would enjoy the benefits of capacitor technology over battery technology described herein, such as lower cost, higher reliability, less maintenance, and shorter re-charge time.

Referring now to FIG. 6, a block diagram illustrating a RAID controller 600 according to an alternate embodiment of the present invention is shown. The RAID controller 600 of FIG. 6 is similar to the RAID controller 100 of FIG. 1; however, the power manager 132 is coupled to communicate with the CPU subsystem 112 with respect to flush operations rather than to the memory controller 102, as shown, and as described with respect to FIG. 7.

Referring now to FIG. 7, a flowchart illustrating operation of the RAID controller 600 of FIG. 6 to perform a flush operation according to an alternate embodiment of the present invention is shown. Flow begins at block 704.

At block 704, the main power source fails to supply power to the RAID controller 600. In response, the capacitors 136 begin supplying power to the predetermined portions of the RAID controller 600, namely to the cache memory 104, the non-volatile memory 108, the memory controller 102, the power manager 132, power regulator 134, CPU subsystem 112, and related circuitry. In particular, the capacitors 136 do not supply power to the disk interface 116, or host interface 118. Additionally, the PCI-X interfaces 216 and 218 and FIFOs 206 that are not needed because they are used only to interface with the disk interface 116 and host interface 118 are not powered by the capacitors 136. Consequently, advantageously, the disk interface 116, host interface 118 and unneeded portions of the memory controller 102 do not consume energy during the flush operation, thereby enabling the RAID controller 100 to employ capacitors 136 capable of storing less energy, which typically implies capacitors 136 that are less expensive and/or require less space. Additionally, the fact that the disk interface 116 and host interface 118 do not consume energy stored in the capacitors 136 leaves more energy stored in the capacitors 136 once the flush operation is complete, which increases the likelihood that the capacitors 136 will continue to supply power to the cache memory 104 after the flush is complete thereby keeping the posted-write data intact, which may alleviate the need for a restore operation when the main power is restored, as described below. Flow proceeds to block 706.

At block 706, the power manager 132 detects the loss of main power and notifies the CPU subsystem 112 that a flush operation of data from the cache memory 104 to the non-volatile memory 108 is needed. Flow proceeds to block 708.

At block 708, the CPU subsystem 112 performs a flush operation by copying the data from the cache memory 104 to the non-volatile memory 108. Flow proceeds to block 712.

At block 712, the CPU subsystem 112 writes the flush results information specified in Table 19 above to the flush results sector of the non-volatile memory 108 upon completion of the flush operation, whether the flush operation was successful, was aborted, or was terminated due to an error. Flow proceeds to block 716.

At block 716, the CPU subsystem 112 places the cache memory 104 into self-refresh mode. Flow proceeds to block 718.

At block 718, the CPU subsystem 112 commands the power manager 132 to cause the capacitors 136 to supply power to the cache memory 104 only. That is, the power manager 132 causes the capacitors 136 to no longer supply power to the CPU subsystem 112, non-volatile memory 108 and the memory controller 102, in order to reduce the amount of energy stored in the capacitors 136 that is consumed while waiting until main power is restored. Flow ends at block 718.

Figure 8:
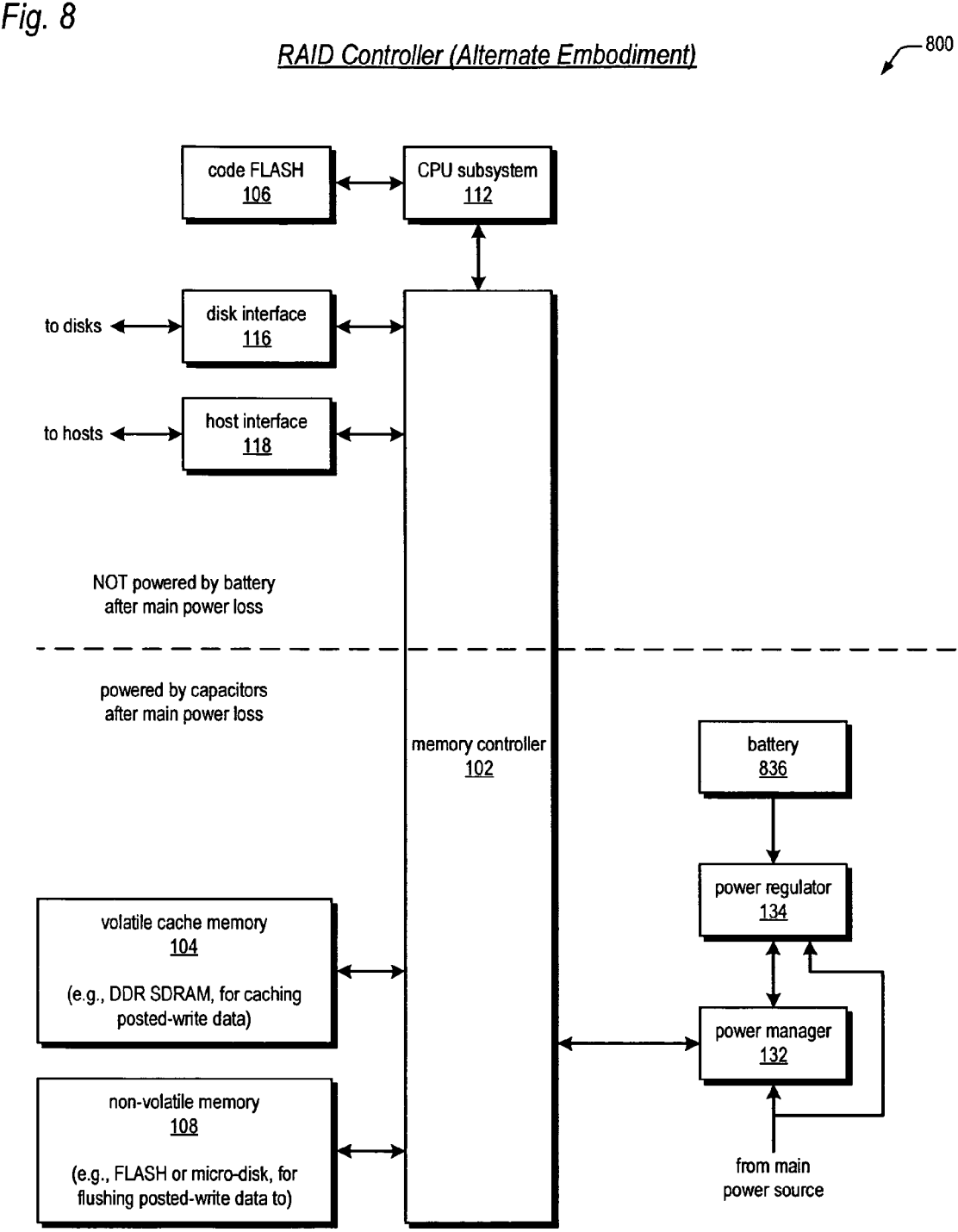
FIG. 8 is a block diagram illustrating a RAID controller according to an alternate embodiment of the present invention.

Although FIGS. 1 through 5 describe embodiments in which capacitors 136 supply power to the RAID controller 100 when main power fails and the CPU subsystem 112 is not involved with and is powered down during the flush operation, other embodiments are contemplated in which a battery or other re-chargeable power source is employed to supply power when main power fails, as illustrated in FIG. 8.

Referring now to FIG. 8, a block diagram illustrating a RAID controller 800 according to an alternate embodiment of the present invention is shown. The RAID controller 800 of FIG. 8 is similar to the RAID controller 100 of FIG. 1; however, in the RAID controller 800 of FIG. 8 the capacitors 136 of FIG. 1 are replaced by a battery 836. The embodiment of FIG. 8 operates similarly to the embodiment of FIG. 1 as described in FIGS. 4 and 5, except the battery 826 supplies power during the main power outage rather than the capacitors 136. That is, the memory controller 102 performs the flush operation, such that the battery 826 does not supply power to the CPU subsystem 112 during the flush operation. Consequently, the embodiment of FIG. 8 may enjoy the benefits of reduced energy consumption of the battery 836 or other re-chargeable power source achieved by having the memory controller 102 perform the flush operation rather than the CPU subsystem 112, such as requiring a smaller capacity and less expensive battery 836 or other re-chargeable power source.

Although the present invention and its objects, features, and advantages have been described in detail, other embodiments are encompassed by the invention. For example, although embodiments have been described in which the interface between the memory controller 102 and the non-volatile memory 108 is an ATA interface, other embodiments are contemplated in which the non-volatile memory 108 comprises a NAND Flash memory array to which the memory controller 102 writes directly. Preferably, each NAND Flash memory device in the array comprises an 8-bit wide data device and the devices are arranged such that the memory controller 102 performs 16-bit or 32-bit wide write accesses to the non-volatile memory 108 to increase the write rate, thereby further decreasing the flush operation time. Still further, although embodiments have been described in which the non-volatile memory 108 comprises FLASH or micro-disk technology, other embodiments may employ NVRAM or any other type of non-volatile storage technology, to which the data may be flushed from the cache memory 104 in a time-effective and power-effective manner.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A write-caching redundant array of inexpensive disks (RAID) controller, comprising:
    a volatile memory;
    a non-volatile memory;
    a central processing unit (CPU), for managing transfers of posted-write data from host computers to said volatile memory and transfers of said posted-write data from said volatile memory to storage devices when a main power source is supplying power to the RAID controller;
    a memory controller, coupled to said volatile memory and said non-volatile memory, wherein said memory controller is configured to buffer said transfers of said posted-write data from said host computers to said volatile memory and said transfers of said posted-write data from said volatile memory to said storage devices when said main power source is supplying power to the RAID controller, wherein said memory controller, rather than said CPU, is configured to flush said posted-write data from said volatile memory to said non-volatile memory when said main power source fails to supply power to the RAID controller; and
    at least one capacitor, coupled to provide power to said memory controller, said volatile memory, and said non-volatile memory when said main power supply fails to supply power to the RAID controller, wherein said CPU is excluded from receiving power from said at least one capacitor when said main power supply fails to supply power to the RAID controller.

2. The RAID controller as recited in claim 1, wherein said memory controller comprises a register for specifying a source location of said posted-write data in said volatile memory, wherein said memory controller flushes said posted-write data from said source location specified in said register to said non-volatile memory.

3. The RAID controller as recited in claim 2, wherein said CPU is configured to program said source location into said register of said memory controller prior to said loss of main power.

4. The RAID controller as recited in claim 2, wherein said memory controller comprises a second register for specifying a destination location of said posted-write data in said non-volatile memory, wherein said memory controller flushes said posted-write data from said source location specified in said first register to said destination location specified in said second register.

5. The RAID controller as recited in claim 4, wherein said CPU is configured to program said destination location into said second register of said memory controller prior to said loss of main power.

6. The RAID controller as recited in claim 1, wherein said posted-write data is comprised in a plurality of non-contiguous regions in said volatile memory.

7. The RAID controller as recited in claim 6, wherein said CPU is configured to program information specifying said plurality of non-contiguous regions into said memory controller prior to said loss of main power.

8. The RAID controller as recited in claim 1, wherein said memory controller comprises an Advanced Technology Attachment (ATA) device interface for writing said posted-write data to said non-volatile memory.

9. The RAID controller as recited in claim 1, further comprising:
    a storage device interface, coupled to said memory controller, for communicating with said storage devices;
    wherein said memory controller is configured to transfer said posted-write data from said volatile memory to said storage device interface when said main power source is supplying power to the RAID controller.

10. The RAID controller as recited in claim 9, wherein said storage device interface is excluded from receiving power from said at least one capacitor when said main power supply fails to supply power to the RAID controller.

11. The RAID controller as recited in claim 1, further comprising:
    a host interface, coupled to said memory controller, for communicating with said host computers;
    wherein said memory controller is configured to transfer said posted-write data from said host interface to said volatile memory when said main power source is supplying power to the RAID controller.

12. The RAID controller as recited in claim 11, wherein said host interface is excluded from receiving power from said at least one capacitor when said main power supply fails to supply power to the RAID controller.

13. The RAID controller as recited in claim 1, further comprising:
    a power manager, coupled to said memory controller, configured to detect said loss of main power, and to signal said memory controller to flush said posted-write data from said volatile memory to said non-volatile memory in response thereto.

14. The RAID controller as recited in claim 13, wherein said power manager is configured to detect said memory controller has completed flushing said posted-write data from said volatile memory to said non-volatile memory, and to responsively signal said memory controller to place said volatile memory into a self-refresh mode.

15. The RAID controller as recited in claim 13, wherein said memory controller is configured to indicate to said power manager whether said memory controller is presently flushing said posted-write data from said volatile memory to said non-volatile memory.

16. The RAID controller as recited in claim 15, wherein said memory controller is further configured to indicate to said power manager whether an error occurred when said memory controller attempted to flush said posted-write data from said volatile memory to said non-volatile memory.

17. The RAID controller as recited in claim 13, wherein said power manager is configured to cause said at least one capacitor to cease supplying power to said non-volatile memory and said memory controller after said memory controller has completed flushing said posted-write data from said volatile memory to said non-volatile memory.

18. The RAID controller as recited in claim 1, wherein said non-volatile memory comprises FLASH memory.

19. The RAID controller as recited in claim 18, wherein said FLASH memory comprises NAND FLASH memory.

20. The RAID controller as recited in claim 1, wherein said non-volatile memory comprises an ATA interface controller.

21. The RAID controller as recited in claim 1, wherein said non-volatile memory comprises a plurality of FLASH memory devices configured in parallel to concurrently receive said posted-write data from said memory controller.

22. The RAID controller as recited in claim 1, wherein said non-volatile memory comprises a non-volatile random access memory (NVRAM).

23. The RAID controller as recited in claim 1, wherein said non-volatile memory comprises a disk drive.

24. The RAID controller as recited in claim 1, wherein said non-volatile memory is removable from the RAID controller, wherein said memory controller refrains from flushing said posted-write data from said volatile memory if said non-volatile memory is not present.

25. The RAID controller as recited in claim 1, wherein said at least one capacitor comprises an Aerogel carbon material.

26. The RAID controller as recited in claim 1, wherein a maximum energy storage capacity of said at least one capacitor is less than 1000 Joules.

27. The RAID controller as recited in claim 1, wherein said memory controller is configured to flush said posted-write data from said volatile memory to said non-volatile memory at an aggregate rate of at least 8 Megabytes/second when said at least one capacitor provides power to the RAID controller.

28. The RAID controller as recited in claim 1, wherein the RAID controller consumes on average less than one Joule per Megabyte to flush said posted-write data from said volatile memory to said non-volatile memory when said at least one capacitor provides power to the RAID controller.

29. The RAID controller as recited in claim 1, wherein the RAID controller consumes on average less than 10 Watts to flush said posted-write data from said volatile memory to said non-volatile memory when said at least one capacitor provides power to the RAID controller.

30. The RAID controller as recited in claim 1, wherein the RAID controller consumes on average more than 20 Watts when said CPU is managing said transfers of said posted-write data from said host computers to said volatile memory and transfers of said posted-write data from said volatile memory to said storage devices when a main power source is supplying power to the RAID controller.

31. The RAID controller as recited in claim 1, wherein said memory controller is configured to restore said posted-write data from said non-volatile memory to said volatile memory when said main power source resumes supplying power to the RAID controller.

32. The RAID controller as recited in claim 31, wherein said memory controller is configured to forego restoring said posted-write data from said non-volatile memory to said volatile memory when said main power source resumes supplying power to the RAID controller, if said at least one capacitor continued to supply power to said volatile memory until said main power source resumed supplying power to the RAID controller.

33. The RAID controller as recited in claim 1, wherein said memory controller comprises a register for specifying an indicator, wherein said memory controller is configured to flush said posted-write data from said volatile memory to said non-volatile memory when said main power source fails to supply power to the RAID controller, only if said indicator is a predetermined value.

34. The RAID controller as recited in claim 33, wherein said CPU is configured to program said indicator prior to said loss of main power.

35. The RAID controller as recited in claim 1, wherein said memory controller comprises a register for indicating whether said memory controller is flushing said posted-write data from said volatile memory to said non-volatile memory, wherein said register is readable by said CPU when said main power source resumes supplying power to the RAID controller.

36. The RAID controller as recited in claim 1, wherein said memory controller comprises a register writeable to cause said memory controller to abort flushing said posted-write data from said volatile memory to said non-volatile memory, wherein said register is writeable by said CPU when said main power source resumes supplying power to the RAID controller.

37. The RAID controller as recited in claim 1, wherein said memory controller is configured to write to said non-volatile memory information indicating results of said flushing said posted-write data from said volatile memory to said non-volatile memory when said main power source fails to supply power to the RAID controller.

38. The RAID controller as recited in claim 37, wherein said information comprises a predetermined signature.

39. The RAID controller as recited in claim 37, wherein said information comprises an indication of whether said flushing completed successfully or with an error.

40. The RAID controller as recited in claim 37, wherein said information comprises a cyclic redundancy code computation of said posted-write data.

41. The RAID controller as recited in claim 37, wherein said memory controller comprises a register for specifying an indicator, wherein said memory controller is configured to write to said non-volatile memory said information only if said indicator is a predetermined value.

42. The RAID controller as recited in claim 41, wherein said CPU is configured to program said indicator prior to said loss of main power.

43. A method for preserving posted-write data in a write-caching redundant array of inexpensive disks (RAID) controller, the method comprising:

supplying power, by at least one capacitor, to a volatile memory, a non-volatile memory, and a memory controller of the RAID controller, in response to a loss of main power to the RAID controller;
foregoing supplying power, by the at least one capacitor, to a central processing unit (CPU) of the RAID controller, in response to the loss of main power to the RAID controller, wherein the CPU manages transfers of the posted-write data from host computers to the volatile memory and transfers of the posted-write data from the volatile memory to storage devices when main power is being supplied to the RAID controller prior to the loss thereof, wherein the memory controller buffers the transfers of the posted-write data from the host computers to the volatile memory and the transfers of the posted-write data from the volatile memory to the storage devices when the main power is being supplied to the RAID controller prior to the loss thereof;
flushing posted-write data, by the memory controller rather than by the CPU, from the volatile memory to the non-volatile memory, in response to the loss of main power.

44. The method as recited in claim 43, further comprising:
determining whether the posted-write data in the volatile memory is still valid when the main power is restored;
determining whether said flushing is still in progress; and
aborting said flushing if the posted-write data in the volatile memory is still valid and said flushing is still in progress.

45. The method as recited in claim 44, further comprising:
determining whether a voltage of the at least one capacitor is above a predetermined threshold; and
said aborting said flushing, only if the voltage of the at least one capacitor is above the predetermined threshold.

46. The method as recited in claim 43, further comprising:
determining whether said flushing failed; and
failing over to a redundant RAID controller if said flushing failed.

47. The method as recited in claim 43, further comprising:
programming, by the CPU, the memory controller with a location of the posted-write data in the volatile memory prior to said flushing.

48. The method as recited in claim 43, further comprising:
foregoing supplying power, by the at least one capacitor, to the memory controller and the non-volatile memory, after said flushing.

49. The method as recited in claim 43, further comprising:
placing the volatile memory into a self refresh mode, after said flushing.

50. The method as recited in claim 43, further comprising:
restoring the posted-write data from the non-volatile memory to the volatile memory, after a restoration of main power.

51. The method as recited in claim 50, further comprising:
said restoring the posted-write data from the non-volatile memory to the volatile memory, after a restoration of main power, only if the posted-write data in the volatile memory is no longer valid.

52. The method as recited in claim 43, wherein the at least one capacitor comprises an Aerogel carbon material.

53. The method as recited in claim 43, further comprising:
writing information specifying results of said flushing, by the memory controller, to a predetermined location in the non-volatile memory.

54. A write-caching redundant array of inexpensive disks (RAID) controller, comprising:
a volatile memory;
a non-volatile memory;
a central processing unit (CPU), for managing transfers of posted-write data from host computers to said volatile memory and transfers of said posted-write data from said volatile memory to storage devices when a main power source is supplying power to the RAID controller, wherein said CPU is configured to program a source location into a register of a memory controller prior to a loss of main power;
the memory controller, coupled to said volatile memory and said non-volatile memory, wherein said memory controller is configured to buffer said transfers of said posted-write data from said host computers to said volatile memory and said transfers of said posted-write data from said volatile memory to said storage devices when said main power source is supplying power to the RAID controller, wherein said memory controller, rather than said CPU, is configured to flush said posted-write data from said volatile memory to said non-volatile memory when said main power source fails to supply power to the RAID controller, wherein said memory controller comprises said register for specifying said source location of said posted-write data in said volatile memory, wherein said memory controller flushes said posted-write data from said source location specified in said register to said non-volatile memory; and
at least one capacitor, coupled to provide power to said memory controller, said volatile memory, and said non-volatile memory when said main power supply fails to supply power to the RAID controller, wherein said CPU is excluded from receiving power from said at least one capacitor when said main power supply fails to supply power to the RAID controller.

55. The RAID controller as recited in claim 54, further comprising:
a storage device interface, coupled to said memory controller, for communicating with said storage devices;
wherein said memory controller is configured to transfer said posted-write data from said volatile memory to said storage device interface when said main power source is supplying power to the RAID controller.

56. The RAID controller as recited in claim 55, wherein said storage device interface is excluded from receiving power from said at least one capacitor when said main power supply fails to supply power to the RAID controller.

57. The RAID controller as recited in claim 54, further comprising:
a host interface, coupled to said memory controller, for communicating with said host computers;
wherein said memory controller is configured to transfer said posted-write data from said host interface to said volatile memory when said main power source is supplying power to the RAID controller.

58. The RAID controller as recited in claim 57, wherein said host interface is excluded from receiving power from said at least one capacitor when said main power supply fails to supply power to the RAID controller.

59. The RAID controller as recited in claim 54, further comprising:
a power manager, coupled to said memory controller, configured to detect said loss of main power, and to signal said memory controller to flush said posted-write data from said volatile memory to said non-volatile memory in response thereto.

60. The RAID controller as recited in claim 59, wherein said power manager is configured to detect said memory controller has completed flushing said posted-write data from said volatile memory to said non-volatile memory, and to responsively signal said memory controller to place said volatile memory into a self-refresh mode.

61. The RAID controller as recited in claim 59, wherein said memory controller is configured to indicate to said power manager whether said memory controller is presently flushing said posted-write data from said volatile memory to said non-volatile memory.

62. The RAID controller as recited in claim 61, wherein said memory controller is further configured to indicate to said power manager whether an error occurred when said memory controller attempted to flush said posted-write data from said volatile memory to said non-volatile memory.

63. The RAID controller as recited in claim 59, wherein said power manager is configured to cause said at least one capacitor to cease supplying power to said non-volatile memory and said memory controller after said memory controller has completed flushing said posted-write data from said volatile memory to said non-volatile memory.

64. The RAID controller as recited in claim 54, wherein said non-volatile memory is removable from the RAID controller, wherein said memory controller refrains from flushing said posted-write data from said volatile memory if said non-volatile memory is not present.

65. The RAID controller as recited in claim 54, wherein said at least one capacitor comprises an Aerogel carbon material.

66. The RAID controller as recited in claim 54, wherein a maximum energy storage capacity of said at least one capacitor is less than 1000 Joules.

67. The RAID controller as recited in claim 54, wherein said memory controller is configured to flush said posted-write data from said volatile memory to said non-volatile memory at an aggregate rate of at least 8 Megabytes/second when said at least one capacitor provides power to the RAID controller.

68. The RAID controller as recited in claim 54, wherein the RAID controller consumes on average less than one Joule per Megabyte to flush said posted-write data from said volatile memory to said non-volatile memory when said at least one capacitor provides power to the RAID controller.

69. The RAID controller as recited in claim 54, wherein the RAID controller consumes on average less than 10 Watts to flush said posted-write data from said volatile memory to said non-volatile memory when said at least one capacitor provides power to the RAID controller.

70. The RAID controller as recited in claim 54, wherein the RAID controller consumes on average more than 20 Watts when said CPU is managing said transfers of said posted-write data from said host computers to said volatile memory and transfers of said posted-write data from said volatile memory to said storage devices when a main power source is supplying power to the RAID controller.

71. The RAID controller as recited in claim 54, wherein said memory controller is configured to restore said posted-write data from said non-volatile memory to said volatile memory when said main power source resumes supplying power to the RAID controller.

72. The RAID controller as recited in claim 71, wherein said memory controller is configured to forego restoring said posted-write data from said non-volatile memory to said volatile memory when said main power source resumes supplying power to the RAID controller, if said at least one capacitor continued to supply power to said volatile memory until said main power source resumed supplying power to the RAID controller.

73. The RAID controller as recited in claim 54, wherein said memory controller comprises a register for specifying an indicator, wherein said memory controller is configured to flush said posted-write data from said volatile memory to said non-volatile memory when said main power source fails to supply power to the RAID controller, only if said indicator is a predetermined value.

74. The RAID controller as recited in claim 73, wherein said CPU is configured to program said indicator prior to said loss of main power.

75. The RAID controller as recited in claim 54, wherein said memory controller comprises a register for indicating whether said memory controller is flushing said posted-write data from said volatile memory to said non-volatile memory, wherein said register is readable by said CPU when said main power source resumes supplying power to the RAID controller.

76. The RAID controller as recited in claim 54, wherein said memory controller comprises a register writeable to cause said memory controller to abort flushing said posted-write data from said volatile memory to said non-volatile memory, wherein said register is writeable by said CPU when said main power source resumes supplying power to the RAID controller.

77. A write-caching redundant array of inexpensive disks (RAID) controller, comprising:

a volatile memory;

a non-volatile memory;

a central processing unit (CPU), for managing transfers of posted-write data from host computers to said volatile memory and transfers of said posted-write data from said volatile memory to storage devices when a main power source is supplying power to the RAID controller, wherein said CPU is configured to program a source location into a first register of a memory controller and program a destination location into a second register of said memory controller prior to a loss of main power;

a memory controller, coupled to said volatile memory and said non-volatile memory, wherein said memory controller is configured to buffer said transfers of said posted-write data from said host computers to said volatile memory and said transfers of said posted-write data from said volatile memory to said storage devices when said main power source is supplying power to the RAID controller, wherein said memory controller, rather than said CPU, is configured to flush said posted-write data from said volatile memory to said non-volatile memory when said main power source fails to supply power to the RAID controller, wherein said memory controller comprises said first register for specifying said source location of said posted-write data in said volatile memory and said second register for specifying said destination location of said posted-write data in said non-volatile memory, wherein said memory controller flushes said posted-write data from said source location specified in said first register to said destination location specified in said second register in said non-volatile memory; and at least one capacitor, coupled to provide power to said memory controller, said volatile memory, and said non-volatile memory when said main power supply fails to supply power to the RAID controller, wherein said CPU is excluded from receiving power from said at least one capacitor when said main power supply fails to supply power to the RAID controller.

78. The RAID controller as recited in claim 77, further comprising:

a storage device interface, coupled to said memory controller, for communicating with said storage devices;

wherein said memory controller is configured to transfer said posted-write data from said volatile memory to said storage device interface when said main power source is supplying power to the RAID controller.

79. The RAID controller as recited in claim 78, wherein said storage device interface is excluded from receiving power from said at least one capacitor when said main power supply fails to supply power to the RAID controller.

80. The RAID controller as recited in claim 77, further comprising:
a host interface, coupled to said memory controller, for communicating with said host computers;
wherein said memory controller is configured to transfer said posted-write data from said host interface to said volatile memory when said main power source is supplying power to the RAID controller.

81. The RAID controller as recited in claim 80, wherein said host interface is excluded from receiving power from said at least one capacitor when said main power supply fails to supply power to the RAID controller.

82. The RAID controller as recited in claim 77, further comprising:
a power manager, coupled to said memory controller, configured to detect said loss of main power, and to signal said memory controller to flush said posted-write data from said volatile memory to said non-volatile memory in response thereto.

83. The RAID controller as recited in claim 82, wherein said power manager is configured to detect said memory controller has completed flushing said posted-write data from said volatile memory to said non-volatile memory, and to responsively signal said memory controller to place said volatile memory into a self-refresh mode.

84. The RAID controller as recited in claim 82, wherein said memory controller is configured to indicate to said power manager whether said memory controller is presently flushing said posted-write data from said volatile memory to said non-volatile memory.

85. The RAID controller as recited in claim 84, wherein said memory controller is further configured to indicate to said power manager whether an error occurred when said memory controller attempted to flush said posted-write data from said volatile memory to said non-volatile memory.

86. The RAID controller as recited in claim 82, wherein said power manager is configured to cause said at least one capacitor to cease supplying power to said non-volatile memory and said memory controller after said memory controller has completed flushing said posted-write data from said volatile memory to said non-volatile memory.

87. The RAID controller as recited in claim 77, wherein said non-volatile memory is removable from the RAID controller, wherein said memory controller refrains from flushing said posted-write data from said volatile memory if said non-volatile memory is not present.

88. The RAID controller as recited in claim 77, wherein said at least one capacitor comprises an Aerogel carbon material.

89. The RAID controller as recited in claim 77, wherein a maximum energy storage capacity of said at least one capacitor is less than 1000 Joules.

90. The RAID controller as recited in claim 77, wherein said memory controller is configured to flush said posted-write data from said volatile memory to said non-volatile memory at an aggregate rate of at least 8 Megabytes/second when said at least one capacitor provides power to the RAID controller.

91. The RAID controller as recited in claim 77, wherein the RAID controller consumes on average less than one Joule per Megabyte to flush said posted-write data from said volatile memory to said non-volatile memory when said at least one capacitor provides power to the RAID controller.

92. The RAID controller as recited in claim 77, wherein the RAID controller consumes on average less than 10 Watts to flush said posted-write data from said volatile memory to said non-volatile memory when said at least one capacitor provides power to the RAID controller.

93. The RAID controller as recited in claim 77, wherein the RAID controller consumes on average more than 20 Watts when said CPU is managing said transfers of said posted-write data from said host computers to said volatile memory and transfers of said posted-write data from said volatile memory to said storage devices when a main power source is supplying power to the RAID controller.

94. The RAID controller as recited in claim 77, wherein said memory controller is configured to restore said posted-write data from said non-volatile memory to said volatile memory when said main power source resumes supplying power to the RAID controller.

95. The RAID controller as recited in claim 94, wherein said memory controller is configured to forego restoring said posted-write data from said non-volatile memory to said volatile memory when said main power source resumes supplying power to the RAID controller, if said at least one capacitor continued to supply power to said volatile memory until said main power source resumed supplying power to the RAID controller.

96. The RAID controller as recited in claim 77, wherein said memory controller comprises a register for specifying an indicator, wherein said memory controller is configured to flush said posted-write data from said volatile memory to said non-volatile memory when said main power source fails to supply power to the RAID controller, only if said indicator is a predetermined value.

97. The RAID controller as recited in claim 96, wherein said CPU is configured to program said indicator prior to said loss of main power.

98. The RAID controller as recited in claim 77, wherein said memory controller comprises a register for indicating whether said memory controller is flushing said posted-write data from said volatile memory to said non-volatile memory, wherein said register is readable by said CPU when said main power source resumes supplying power to the RAID controller.

99. The RAID controller as recited in claim 77, wherein said memory controller comprises a register writeable to cause said memory controller to abort flushing said posted-write data from said volatile memory to said non-volatile memory, wherein said register is writeable by said CPU when said main power source resumes supplying power to the RAID controller.

100. A write-caching redundant array of inexpensive disks (RAID) controller, comprising:
a volatile memory;
a non-volatile memory;
a central processing unit (CPU), for managing transfers of posted-write data from host computers to said volatile memory and transfers of said posted-write data from said volatile memory to storage devices when a main power source is supplying power to the RAID controller, wherein said posted-write data is comprised in a plurality of non-contiguous regions in said volatile memory, wherein said CPU is configured to program information specifying said plurality of non-contiguous regions into a memory controller prior to said loss of main power;
the memory controller, coupled to said volatile memory and said non-volatile memory, wherein said memory controller is configured to buffer said transfers of said posted-write data from said host computers to said volatile memory and said transfers of said posted-write data from said volatile memory to said storage devices when said main power source is supplying power to the RAID controller, wherein said memory controller, rather than said CPU, is configured to flush said posted-write data from said volatile memory to said non-volatile memory when said main power source fails to supply power to the RAID controller; and at least one capacitor, coupled to provide power to said memory controller, said volatile memory, and said non-volatile memory when said main power supply fails to supply power to the RAID controller, wherein said CPU is excluded from receiving power from said at least one capacitor when said main power supply fails to supply power to the RAID controller.

101. The RAID controller as recited in claim 100, further comprising:

a storage device interface, coupled to said memory controller, for communicating with said storage devices;

wherein said memory controller is configured to transfer said posted-write data from said volatile memory to said storage device interface when said main power source is supplying power to the RAID controller.

102. The RAID controller as recited in claim 101 wherein said storage device interface is excluded from receiving power from said at least one capacitor when said main power supply fails to supply power to the RAID controller.

103. The RAID controller as recited in claim 100, further comprising:

a host interface, coupled to said memory controller, for communicating with said host computers;

wherein said memory controller is configured to transfer said posted-write data from said host interface to said volatile memory when said main power source is supplying power to the RAID controller.

104. The RAID controller as recited in claim 103, wherein said host interface is excluded from receiving power from said at least one capacitor when said main power supply fails to supply power to the RAID controller.

105. The RAID controller as recited in claim 100, further comprising:

a power manager, coupled to said memory controller, configured to detect said loss of main power, and to signal said memory controller to flush said posted-write data from said volatile memory to said non-volatile memory in response thereto.

106. The RAID controller as recited in claim 105, wherein said power manager is configured to detect said memory controller has completed flushing said posted-write data from said volatile memory to said non-volatile memory, and to responsively signal said memory controller to place said volatile memory into a self-refresh mode.

107. The RAID controller as recited in claim 105, wherein said memory controller is configured to indicate to said power manager whether said memory controller is presently flushing said posted-write data from said volatile memory to said non-volatile memory.

108. The RAID controller as recited in claim 107, wherein said memory controller is further configured to indicate to said power manager whether an error occurred when said memory controller attempted to flush said posted-write data from said volatile memory to said non-volatile memory.

109. The RAID controller as recited in claim 105, wherein said power manager is configured to cause said at least one capacitor to cease supplying power to said non-volatile memory and said memory controller after said memory controller has completed flushing said posted-write data from said volatile memory to said non-volatile memory.

110. The RAID controller as recited in claim 100, wherein said non-volatile memory is removable from the RAID controller, wherein said memory controller refrains from flushing said posted-write data from said volatile memory if said non-volatile memory is not present.

111. The RAID controller as recited in claim 100, wherein said at least one capacitor comprises an Aerogel carbon material.

112. The RAID controller as recited in claim 100, wherein a maximum energy storage capacity of said at least one capacitor is less than 1000 Joules.

113. The RAID controller as recited in claim 100, wherein said memory controller is configured to flush said posted-write data from said volatile memory to said non-volatile memory at an aggregate rate of at least 8 Megabytes/second when said at least one capacitor provides power to the RAID controller.

114. The RAID controller as recited in claim 100, wherein the RAID controller consumes on average less than one Joule per Megabyte to flush said posted-write data from said volatile memory to said non-volatile memory when said at least one capacitor provides power to the RAID controller.

115. The RAID controller as recited in claim 100, wherein the RAID controller consumes on average less than 10 Watts to flush said posted-write data from said volatile memory to said non-volatile memory when said at least one capacitor provides power to the RAID controller.

116. The RAID controller as recited in claim 100, wherein the RAID controller consumes on average more than 20 Watts when said CPU is managing said transfers of said posted-write data from said host computers to said volatile memory and transfers of said posted-write data from said volatile memory to said storage devices when a main power source is supplying power to the RAID controller.

117. The RAID controller as recited in claim 100, wherein said memory controller is configured to restore said posted-write data from said non-volatile memory to said volatile memory when said main power source resumes supplying power to the RAID controller.

118. The RAID controller as recited in claim 117, wherein said memory controller is configured to forego restoring said posted-write data from said non-volatile memory to said volatile memory when said main power source resumes supplying power to the RAID controller, if said at least one capacitor continued to supply power to said volatile memory until said main power source resumed supplying power to the RAID controller.

119. The RAID controller as recited in claim 100, wherein said memory controller comprises a register for specifying an indicator, wherein said memory controller is configured to flush said posted-write data from said volatile memory to said non-volatile memory when said main power source fails to supply power to the RAID controller, only if said indicator is a predetermined value.

120. The RAID controller as recited in claim 119, wherein said CPU is configured to program said indicator prior to said loss of main power.

121. The RAID controller as recited in claim 100, wherein said memory controller comprises a register for indicating whether said memory controller is flushing said posted-write data from said volatile memory to said non-volatile memory, wherein said register is readable by said CPU when said main power source resumes supplying power to the RAID controller.

122. The RAID controller as recited in claim 100, wherein said memory controller comprises a register writeable to cause said memory controller to abort flushing said posted-write data from said volatile memory to said non-volatile memory, wherein said register is writeable by said CPU when said main power source resumes supplying power to the RAID controller.

123. A write-caching redundant array of inexpensive disks (RAID) controller, comprising:

a volatile memory;

a non-volatile memory;

a central processing unit (CPU), for managing transfers of posted-write data from host computers to said volatile memory and transfers of said posted-write data from said volatile memory to storage devices when a main power source is supplying power to the RAID controller;

a memory controller, coupled to said volatile memory and said non-volatile memory, wherein said memory controller is configured to buffer said transfers of said posted-write data from said host computers to said volatile memory and said transfers of said posted-write data from said volatile memory to said storage devices when said main power source is supplying power to the RAID controller, wherein said memory controller, rather than said CPU, is configured to flush said posted-write data from said volatile memory to said non-volatile memory when said main power source fails to supply power to the RAID controller, wherein said memory controller is configured to indicate to a power manager whether said memory controller is presently flushing said posted-write data from said volatile memory to said non-volatile memory, wherein said memory controller is further configured to indicate to said power manager whether an error occurred when said memory controller attempted to flush said posted-write data from said volatile memory to said non-volatile memory;

at least one capacitor, coupled to provide power to said memory controller, said volatile memory, and said non-volatile memory when said main power supply fails to supply power to the RAID controller, wherein said CPU is excluded from receiving power from said at least one capacitor when said main power supply fails to supply power to the RAID controller; and the power manager, coupled to said memory controller, configured to detect said loss of main power, and to signal said memory controller to flush said posted-write data from said volatile memory to said non-volatile memory in response thereto.

124. The RAID controller as recited in claim 123, further comprising:

a storage device interface, coupled to said memory controller, for communicating with said storage devices;

wherein said memory controller is configured to transfer said posted-write data from said volatile memory to said storage device interface when said main power source is supplying power to the RAID controller.

125. The RAID controller as recited in claim 124, wherein said storage device interface is excluded from receiving power from said at least one capacitor when said main power supply fails to supply power to the RAID controller.

126. The RAID controller as recited in claim 123, further comprising:

a host interface, coupled to said memory controller, for communicating with said host computers;

wherein said memory controller is configured to transfer said posted-write data from said host interface to said volatile memory when said main power source is supplying power to the RAID controller.

127. The RAID controller as recited in claim 126, wherein said host interface is excluded from receiving power from said at least one capacitor when said main power supply fails to supply power to the RAID controller.

128. The RAID controller as recited in claim 123, wherein said power manager is configured to detect said memory controller has completed flushing said posted-write data from said volatile memory to said non-volatile memory, and to responsively signal said memory controller to place said volatile memory into a self-refresh mode.

129. The RAID controller as recited in claim 123, wherein said power manager is configured to cause said at least one capacitor to cease supplying power to said non-volatile memory and said memory controller after said memory controller has completed flushing said posted-write data from said volatile memory to said non-volatile memory.

130. The RAID controller as recited in claim 123, wherein said non-volatile memory is removable from the RAID controller, wherein said memory controller refrains from flushing said posted-write data from said volatile memory if said non-volatile memory is not present.

131. The RAID controller as recited in claim 123, wherein said at least one capacitor comprises an Aerogel carbon material.

132. The RAID controller as recited in claim 123, wherein a maximum energy storage capacity of said at least one capacitor is less than 1000 Joules.

133. The RAID controller as recited in claim 123, wherein said memory controller is configured to flush said posted-write data from said volatile memory to said non-volatile memory at an aggregate rate of at least 8 Megabytes/second when said at least one capacitor provides power to the RAID controller.

134. The RAID controller as recited in claim 123, wherein the RAID controller consumes on average less than one Joule per Megabyte to flush said posted-write data from said volatile memory to said non-volatile memory when said at least one capacitor provides power to the RAID controller.

135. The RAID controller as recited in claim 123, wherein the RAID controller consumes on average less than 10 Watts to flush said posted-write data from said volatile memory to said non-volatile memory when said at least one capacitor provides power to the RAID controller.

136. The RAID controller as recited in claim 123, wherein the RAID controller consumes on average more than 20 Watts when said CPU is managing said transfers of said posted-write data from said host computers to said volatile memory and transfers of said posted-write data from said volatile memory to said storage devices when a main power source is supplying power to the RAID controller.

137. The RAID controller as recited in claim 123, wherein said memory controller is configured to restore said posted-write data from said non-volatile memory to said volatile memory when said main power source resumes supplying power to the RAID controller.

138. The RAID controller as recited in claim 137, wherein said memory controller is configured to forego restoring said posted-write data from said non-volatile memory to said volatile memory when said main power source resumes supplying power to the RAID controller, if said at least one capacitor continued to supply power to said volatile memory until said main power source resumed supplying power to the RAID controller.

139. The RAID controller as recited in claim 123, wherein said memory controller comprises a register for specifying an indicator, wherein said memory controller is configured to flush said posted-write data from said volatile memory to said non-volatile memory when said main power source fails to supply power to the RAID controller, only if said indicator is a predetermined value.

140. The RAID controller as recited in claim 139, wherein said CPU is configured to program said indicator prior to said loss of main power.

141. The RAID controller as recited in claim 123, wherein said memory controller comprises a register for indicating whether said memory controller is flushing said posted-write data from said volatile memory to said non-volatile memory, wherein said register is readable by said CPU when said main power source resumes supplying power to the RAID controller.

142. The RAID controller as recited in claim 123, wherein said memory controller comprises a register writeable to cause said memory controller to abort flushing said posted-write data from said volatile memory to said non-volatile memory, wherein said register is writeable by said CPU when said main power source resumes supplying power to the RAID controller.

143. A method for preserving posted-write data in a write-caching redundant array of inexpensive disks (RAID) controller, the method comprising:
supplying power, by at least one capacitor, to a volatile memory, a non-volatile memory, and a memory controller of the RAID controller, in response to a loss of main power to the RAID controller, wherein said memory controller comprises a register for specifying a source location of said posted-write data in said volatile memory, wherein said memory controller flushes said posted-write data from said source location specified in said register to said non-volatile memory;
foregoing supplying power, by the at least one capacitor, to a central processing unit (CPU) of the RAID controller, in response to the loss of main power to the RAID controller, wherein the CPU manages transfers of the posted-write data from host computers to the volatile memory and transfers of the posted-write data from the volatile memory to storage devices when main power is being supplied to the RAID controller prior to the loss thereof, wherein the memory controller buffers the transfers of the posted-write data from the host computers to the volatile memory and the transfers of the posted-write data from the volatile memory to the storage devices when the main power is being supplied to the RAID controller prior to the loss thereof, wherein said CPU is configured to program said source location into said register of said memory controller prior to said loss of main power; and
flushing posted-write data, by the memory controller rather than by the CPU, from the volatile memory to the non-volatile memory, in response to the loss of main power.

144. A method for preserving posted-write data in a write-caching redundant array of inexpensive disks (RAID) controller, the method comprising:
supplying power, by at least one capacitor, to a volatile memory, a non-volatile memory, and a memory controller of the RAID controller, in response to a loss of main power to the RAID controller, wherein said memory controller comprises a first register for specifying a source location of said posted-write data in said volatile memory and a second register for specifying a destination location of said posted-write data in said non-volatile memory, wherein said memory controller flushes said posted-write data from said source location specified in said first register to said destination location specified in said second register;
foregoing supplying power, by the at least one capacitor, to a central processing unit (CPU) of the RAID controller, in response to the loss of main power to the RAID controller, wherein the CPU manages transfers of the posted-write data from host computers to the volatile memory and transfers of the posted-write data from the volatile memory to storage devices when main power is being supplied to the RAID controller prior to the loss thereof, wherein the memory controller buffers the transfers of the posted-write data from the host computers to the volatile memory and the transfers of the posted-write data from the volatile memory to the storage devices when the main power is being supplied to the RAID controller prior to the loss thereof, wherein said CPU is configured to program said destination location into said second register of said memory controller prior to said loss of main power; and
flushing posted-write data, by the memory controller rather than by the CPU, from the volatile memory to the non-volatile memory, in response to the loss of main power.

145. A method for preserving posted-write data in a write-caching redundant array of inexpensive disks (RAID) controller, wherein said posted-write data is comprised in a plurality of non-contiguous regions in a volatile memory, the method comprising:
supplying power, by at least one capacitor, to said volatile memory, a non-volatile memory, and a memory controller of the RAID controller, in response to a loss of main power to the RAID controller;
foregoing supplying power, by the at least one capacitor, to a central processing unit (CPU) of the RAID controller, in response to the loss of main power to the RAID controller, wherein the CPU manages transfers of the posted-write data from host computers to the volatile memory and transfers of the posted-write data from the volatile memory to storage devices when main power is being supplied to the RAID controller prior to the loss thereof, wherein the memory controller buffers the transfers of the posted-write data from the host computers to the volatile memory and the transfers of the posted-write data from the volatile memory to the storage devices when the main power is being supplied to the RAID controller prior to the loss thereof, wherein said CPU is configured to program information specifying said plurality of non-contiguous regions into said memory controller prior to said loss of main power; and
flushing posted-write data, by the memory controller rather than by the CPU, from the volatile memory to the non-volatile memory, in response to the loss of main power.

146. A method for preserving posted-write data in a write-caching redundant array of inexpensive disks (RAID) controller, the method comprising:
supplying power, by at least one capacitor, to a volatile memory, a non-volatile memory, a memory controller, and a power manager of the RAID controller, in response to a loss of main power to the RAID controller, wherein the power manager is coupled to said memory controller, configured to detect said loss of main power, and to signal said memory controller to flush said posted-write data from said volatile memory to said non-volatile memory in response thereto, wherein said memory controller is configured to indicate to said power manager whether said memory controller is presently flushing said posted-write data from said volatile memory to said non-volatile memory, wherein said memory controller is further configured to indicate to said power manager whether an error occurred when said memory controller attempted to flush said posted-write data from said volatile memory to said non-volatile memory;

foregoing supplying power, by the at least one capacitor, to a central processing unit (CPU) of the RAID controller, in response to the loss of main power to the RAID controller, wherein the CPU manages transfers of the posted-write data from host computers to the volatile memory and transfers of the posted-write data from the volatile memory to storage devices when main power is being supplied to the RAID controller prior to the loss thereof, wherein the memory controller buffers the transfers of the posted-write data from the host computers to the volatile memory and the transfers of the posted-write data from the volatile memory to the storage devices when the main power is being supplied to the RAID controller prior to the loss thereof; and flushing posted-write data, by the memory controller rather than by the CPU, from the volatile memory to the non-volatile memory, in response to the loss of main power.

* * * * *